(12) United States Patent
Tanaka

(10) Patent No.: US 6,388,963 B1
(45) Date of Patent: May 14, 2002

(54) SIGNAL GENERATION METHOD, SIGNAL GENERATION METHOD USED IN OPTICAL DISK RECORDING AND REPRODUCING APPARATUS, OPTICAL PICK-UP USING SIGNAL GENERATION METHOD, AND OPTICAL DISK RECORDING AND REPRODUCING APPARATUS HAVING THIS OPTICAL PICK-UP

(75) Inventor: Norio Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/329,088

(22) Filed: Jun. 9, 1999

(30) Foreign Application Priority Data

Jun. 12, 1998 (JP) .......................................... 10-165427

(51) Int. Cl.$^7$ ................................................ G11B 7/00
(52) U.S. Cl. ............................... 369/44.26; 369/44.37; 369/53.23; 369/44.41
(58) Field of Search .................... 369/44.26, 44.41, 369/44.42, 44.43, 44.36, 44.29, 44.25, 44.37, 44.28, 44.35, 44.34, 53.23

(56) References Cited

U.S. PATENT DOCUMENTS 5,638,350 A * 6/1997 Fuji ......................... 369/44.37
5,828,634 A * 10/1998 Ohno et al. ............... 369/44.26
5,850,081 A * 12/1998 Yanagisawa ............. 369/44.41
5,905,703 A * 5/1999 Osada ....................... 369/44.41

* cited by examiner

*Primary Examiner*—David Hudspeth
*Assistant Examiner*—Kim-Kwok Chu
(74) *Attorney, Agent, or Firm*—Crosby, Heafey, Roach & May

(57) ABSTRACT

A signal generation method capable of generating a cross track signal having a predetermined phase difference from a tracking error signal even in a land and groove recording method in which a land width and a groove width are made equal, wherein a main spot is detected at a split photodetector, a first side spot is detected at a split photodetector, and a second side spot is detected at a split photodetector; a first error is calculated as an error of the optical disk in a radial direction from four detection signals detected at the photodetector, a second error is calculated as the error of two detection signals of the photodetector, a third error is calculated as the error of two detection signals of the third photodetector, and the sum of the second and third errors is subtracted from the first error to calculate a tracking error signal; and a difference between the second error and the third error is found to calculate a cross track signal having a phase shifted by 90° from the tracking error signal TE.

24 Claims, 15 Drawing Sheets

SIGNAL GENERATION METHOD BY PRESENT INVENTION

PUSH-PULL SIGNAL

SUM SIGNAL

TRACKING ERROR SIGNAL AND
CROSS TRACK SIGNAL

SUM SIGNAL WHEN LAND GROOVE RECORDING

PUSH-PULL SIGNAL BY PRESENT INVENTION

CROSS TRACK SIGNAL GENERATION
BY PRESENT INVENTION

SPEED POSITION DECTION
BLOCK CHART

RELATIONSHIP BETWEEN TE SIG AND CTS SIG

CONTROL BLOCK CHART FOR TRACKING PULL-IN 2

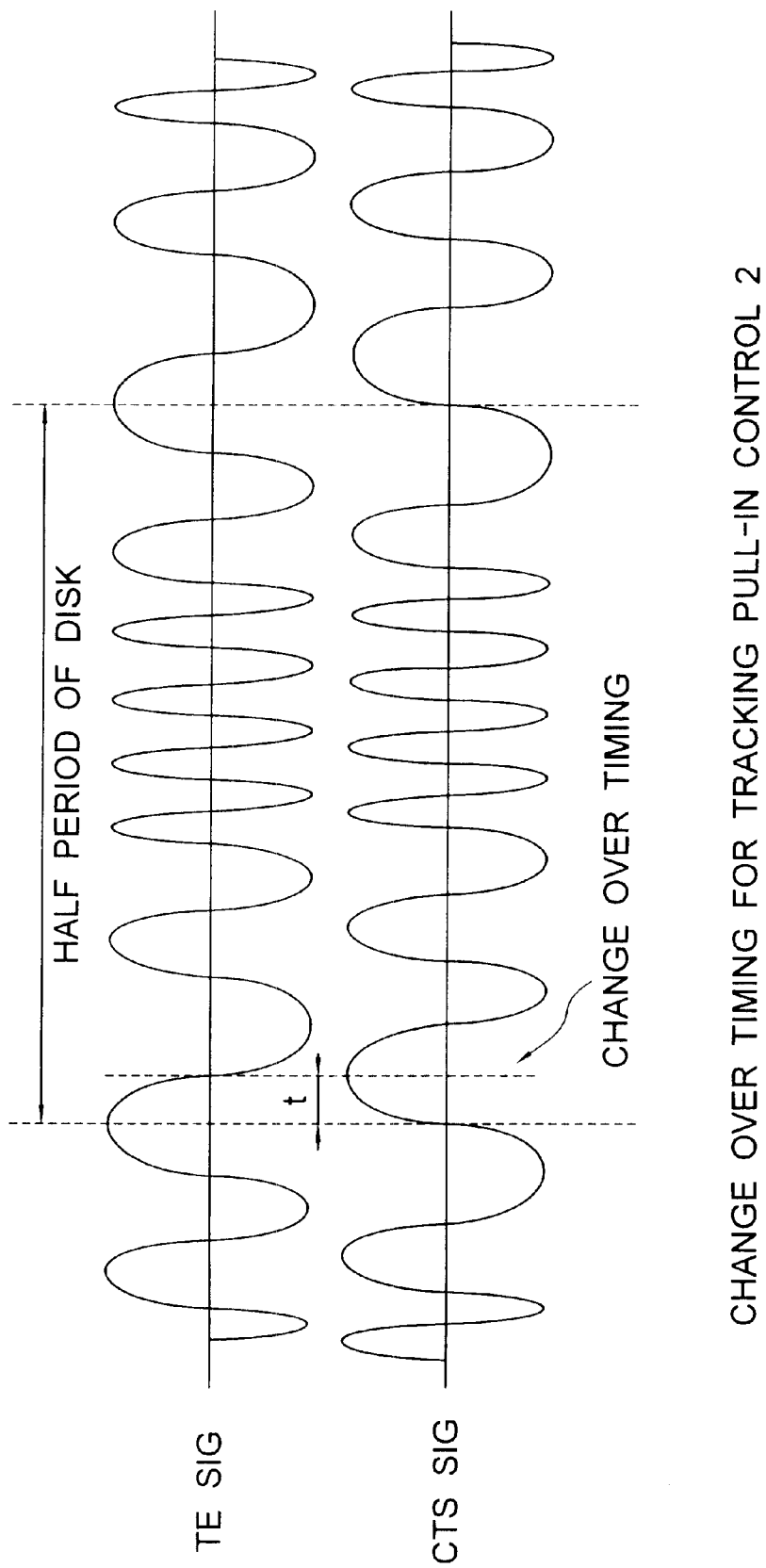

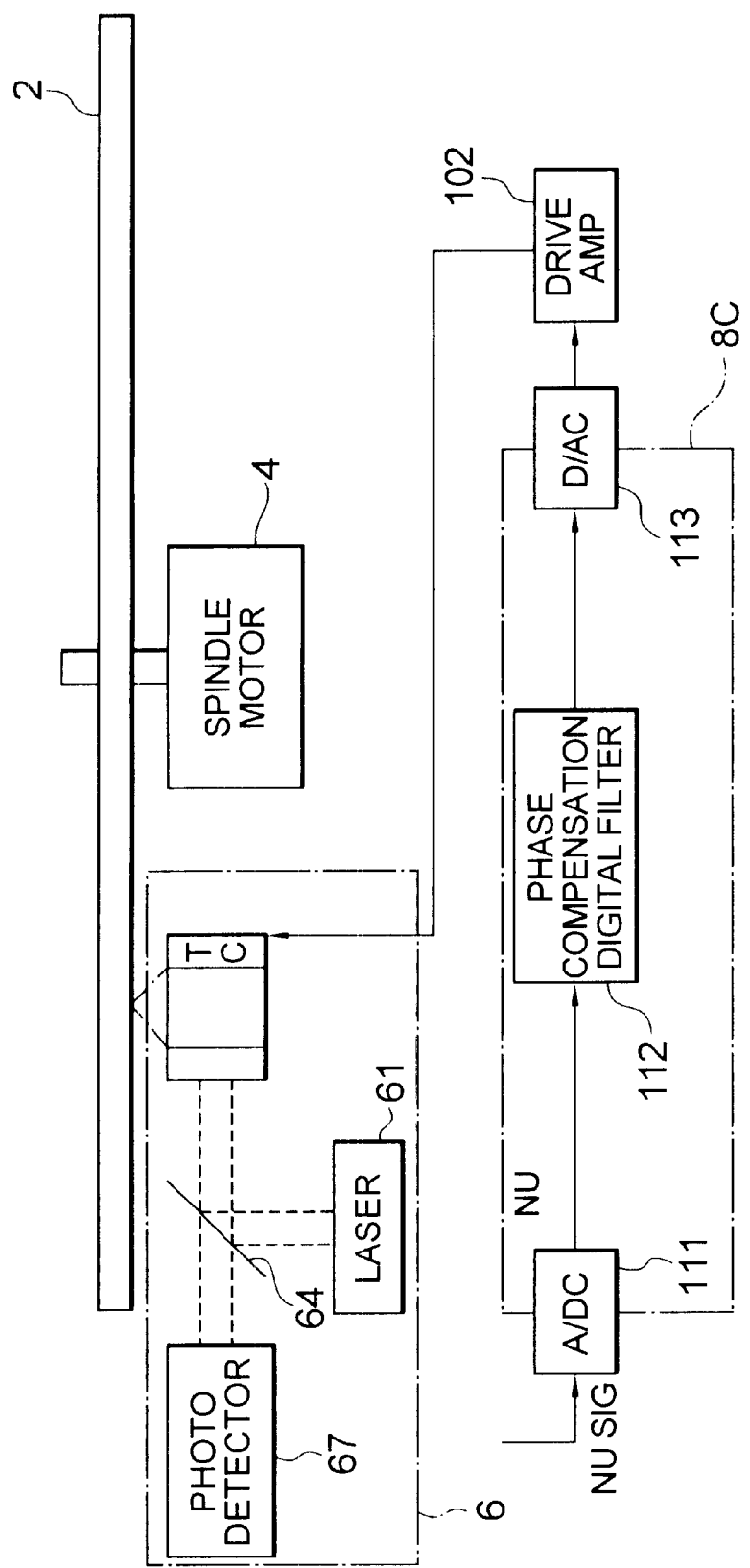

SIGNAL GENERATION METHOD, SIGNAL GENERATION METHOD USED IN OPTICAL DISK RECORDING AND REPRODUCING APPARATUS, OPTICAL PICK-UP USING SIGNAL GENERATION METHOD, AND OPTICAL DISK RECORDING AND REPRODUCING APPARATUS HAVING THIS OPTICAL PICK-UP

BACKGROUND OF THE INVENTION

Field of the Invention

The present invention relates to a recording and reproducing apparatus for recording and reproducing data using a laser disk, a compact disk, or other optical disk.

More specifically, the present invention relates to a signal generation method used in an optical disk reproducing apparatus for reproducing data recorded on an optical disk by using a beam of light (spot) to scan along a land and guide groove provided on the optical disk, which detects a tracking error signal representing the position of the spot of the beam of light with respect to a guide groove provided in the optical disk and a cross track signal of a phase advanced by 90° relative to the tracking error signal, and to an apparatus of the same.

Also, the present invention relates to an optical pick-up using this signal generation method.

Further, the present invention relates to an optical disk recording and reproduction method using the tracking signal and the cross track signal obtained by the above method to control the tracking servo from an off state to a tracking-on state, that is, so-called tracking servo pull-in control, and to an apparatus using the same.

FIG. 1 is a schematic view of the configuration of an optical disk reproducing apparatus of a differential push-pull system. The optical disk reproducing apparatus of the differential push-pull system illustrated in FIG. 1 comprises an optical disk 2 on which the data is recorded, a spindle motor 4 for rotating the optical disk 2, an optical pick-up 6, a control processor unit 8, and a drive amplifier unit 10.

FIG. 2 is a view of the configuration of the optical system of the optical pick-up 6 illustrated in FIG. 1.

In FIG. 1 and FIG. 2, the optical pick-up 6 has mounted on it a laser 61, a collimator lens 62, a diffraction lattice 63, a beam splitter 64, an objective lens 65, a focus lens 66, a photodetector and processor unit 67, a tracking coil 68, and a focus coil 69.

The laser 61, collimator lens 62, diffraction lattice 63, beam splitter 64, objective lens 65, and focus lens 66 constitute an optical system which directs a spot to the optical disk 2 and guides the reflected light of the spot from the optical disk 2 to the photodetector and processor unit 67.

This optical pick-up 6 is an optical pick-up of a two-axis drive system. In this optical pick-up, large movement in the track direction of the optical disk 2 is carried out by using a carriage (not shown) on which the optical pick-up 6 is mounted. After the optical pick-up 6 mounted on the carriage moves to the vicinity of the target position of the optical disk 2, a tracking coil 68 is used for positioning to the precise track position.

FIG. 3 is a view illustrating a method of detecting the position of a beam (spot) of light irradiated on the lands and grooves of the optical disk 2 and the reflected light of the beam of light at the photodetector and processor unit 67 mounted on the optical pick-up 6 illustrated in FIG. 2 and generating a tracking error signal and a cross track signal from the detection signal when the width of the lands and the width of the guide grooves (hereinafter referred to as the "grooves") in the optical disk 2 are different.

The photodetector and processor unit 67 has a first side photodetector (or second photodetector) 671, a center photodetector (main photodetector or first photodetector) 672, and a second side photodetector (or third photodetector) 673. The photodetector and processor unit 67 further has a signal processor unit 675.

The first side photodetector 671 and the second side photodetector 673 are each comprised of split photodetectors having two sections in the track direction of the optical disk 2. The center photodetector 672 is comprised of a split photodetector having four sections in the track direction (radial direction) and tangential direction (circumferential direction) of the optical disk 2.

In this way, FIG. 2 and FIG. 3 illustrate an example of optical disk 6 of the three-point optical detection system using three types of beams of light (three spots of light) and three types of photodetectors 671 to 673.

The signal processor unit 675 has a signal input unit 675A for receiving as its inputs detection signals from the photodetectors 671 to 673, a focus error signal processor unit 675B for calculating a focus error signal FE from the input signals, a tracking error signal processor unit 675C for calculating a tracking error signal TE, a cross track signal processor unit 675D for calculating a cross track signal CTS, and a sum signal processor unit 675E for calculating a sum signal PI.

It is also possible to perform the signal processing of the signal processor unit 675 at the control processor unit 8, but a case where it is performed in the photodetector and processor unit 67 will be explained below.

The control processor unit 8 has three analog/digital (A/D) converters 81 to 83, two normalization circuits 84 and 85, two phase compensation digital filters 86 and 87, and two digital/analog (D/A) converters 88 and 89.

The processing inside the control processor unit 8 is carried out in a digital manner by using for example a digital signal processor (DSP), therefore the A/D converters 81 to 83 convert the analog signals from the photodetector 67 to digital signals and convert the processing results of the DSP to analog signals suited for the drive amplifier unit 10 at the D/A converters 88 and 89.

The drive amplifier unit 10 has two drive amplifiers 101 and 102.

The first drive amplifier 101 is used for controlling the drive of the focus coil 69 in the optical pick-up 6, while the second drive amplifier 102 is used for controlling the drive of the tracking coil 68 in the optical pick-up 6.

The configuration of the first side photodetector 671, the center photodetector 672, and the second side photodetector 673 in the photodetector unit 67 illustrated in FIG. 3 is also applied to embodiments of the present invention. However, as is apparent from the description given later, the conditions of the land width and the groove width in the optical disk 2 and the positional relationship of the spots differ between the related art and the present invention.

The general operation of the optical disk reproducing apparatus of the differential push-pull system illustrated in FIG. 1 and FIG. 2 will be explained referring to FIG. 3 as well.

In the optical system illustrated in FIG. 2, one beam of laser light emitted from the laser 61 is converged at the collimator lens 62 and made to strike the diffraction lattice 63. The diffraction lattice 63 diffracts the beam of light from the collimator lens 62 to generate three beams of light and makes them strike the beam splitter 64. The three diffracted beams striking the beam splitter 64 pass through the beam splitter 64 to strike the objective lens 65. In the objective lens 65, they are then converged to the lands and the grooves of the optical disk 2 as spots (indicated by the circles in FIG. 3).

The spots of the beam of light irradiated to the lands or grooves of the optical disk 2 are reflected from the lands or grooves to return to the objective lens 65, then enter from the objective lens 65 into the beam splitter 64. At the beam splitter 64, they are directed toward the focus lens 66 and are received at photodetectors 671, 672, and 673 of the photodetector unit 67.

The spots on the optical disk 2 have different phases according to the lands or grooves. The amounts of light striking the photodetectors 671 to 673 are therefore different.

The photodetectors 671 and 672 detect the amounts of incident light. The focus error signal processor unit 675B, tracking error signal processor unit 675C, cross track signal processor unit 675D, and sum signal processor unit 675E perform the following processing on the detected values and calculate the focus error signal FE, tracking error signal TE, cross track signal CTS, and sum signal PI.

When the analog focus error signal FE, tracking error signal TE, and sum signal PI (or RF signal) are output from the photodetector unit 67 (photodetectors 671 to 673), the A/D converters 81 to 83 at the control processor unit 8 convert these analog signals to digital signals.

The focus error signal FE converted at the A/D converter 81 and the sum signal PI converted at the A/D converters 81 to 83 are supplied to the normalization circuit 84 where the focus error signal FE is divided by the sum signal PI to normalize the focus error signal FE. Similarly, the tracking error signal TE converted at the A/D converter 82 and the sum signal PI converted at the A/D converter 83 are supplied to the normalization circuit 85 where the tracking error signal TE is divided by the sum signal PI to normalize the tracking error signal TE.

The normalized focus error signal FE is phase compensated at the phase compensation digital filter 86. Similarly, the normalized tracking error signal TE is phase compensated at the phase compensation digital filter 87. The D/A converters 88 and 89 convert the phase-compensated focus error signal FE and tracking error signal TE to analog signals.

The phase-compensated focus error signal converted to the analog signal at the D/A converter 88 is amplified at the drive amplifier unit 101 and drives the focus coil 69 mounted on the optical pick-up 6. Due to this, the position of the objective lens 65 of the optical pick-up 6 is controlled with respect to the optical disk 2 so that the focus has an error of 0.

In the same way as the above, the phase-compensated tracking error signal converted to an analog signal at the D/A converter 89 is amplified at the drive amplifier unit 102 and supplied to the tracking coil 68. By this, the track position of the optical pick-up 6 is controlled so that the positional deviation (track error) of the optical unit 2 in the track direction (radial direction) becomes 0.

In this way, the control processor unit 8 is basically constituted by the focus control system comprising the A/D converter 81, normalization circuit 84, phase compensation digital filter 86, and D/A converter 88 and the tracking control system comprising the A/D converter 82, normalization circuit 85, phase compensation digital filter 87, and D/A converter 89.

Note that the focus control system is not the theme of the present invention, therefore a detailed description thereof will be omitted. Accordingly, a detailed explanation of the method of calculation of the focus error signal FE will be omitted also. These are equivalent to those of the related art.

The A/D conversion, normalization, and phase compensation in the control processor unit 8 explained above were only explained in brief. Details will be explained in the embodiments of the present invention.

First, an explanation will be given of the positions of the spots on the optical disk 2 and the method of generation of the tracking error signal TE and cross track signal CTS by the differential push-pull system in the signal processor unit 675 of the photodetector and processor unit 67.

The diffraction lattice 63 mounted on the optical pick-up 6 forms three beams from the single beam emitted from the laser 61 and converged at the collimator lens 62 and irradiates the optical disk 2 with three spots.

As illustrated in FIG. 3, in this example, the two side spots, that is, the first side spot S1 and second side spot S2, are located shifted by ½ of the land pitch in the radial direction relative to the main spot SM on the optical disk 2.

At this time, the differential push-pull signal of the main spot SM (hereinafter referred to as the main push-pull signal) ((A+D)−(B+C)), the differential push-pull signal of the first side spot S1 (hereinafter referred to as the first side push-pull signal) (E−F), and the differential push-pull signal of the second side spot S2 (hereinafter referred to as the second side push-pull signal) (G−H) are shifted in phase by exactly 180° relative to the position in the tracking direction of the optical disk 2 as illustrated in FIG. 4.

In order to make the amplitude of the main push-pull signal and the amplitude of the sum of the first and second side push-pull signals ((E−F)+(G−H)) match, the sum of the first and second side push-pull signals Is amplified by exactly the ratio of the amount of light with respect to the main push-pull signal (the amplification gain at this time is defined as α), the sum of the two side push-pull signals amplified by the ratio of the amount of light is subtracted from the main push-pull signal ((A+D)−(B+C)), and the result is defined as the tracking error signal TE illustrated in FIG. 6. The equation for calculating the tracking error signal TE is shown below:

$$TE = ((A+D)-(B+C)) - \alpha((E-F)+(G-H)) \tag{1}$$

The focus error signal FE is calculated by for example the following equation:

$$FE = ((A-C)+(B-D)) \tag{2}$$

In the three-point spot method, the push-pull signal is not only defined by the position of the main spot SM relative to the lands on the optical disk 2, but is also defined by the positions of the side spots S1 and S2 relative to the grooves. In other words, in the three-point spot method, the push-pull signal is not only defined by the detection value of the center photodetector 672, but is also defined by the detection values of the side photodetector 671 and 673.

For this reason, if only using the main push-pull signal ((A+D)−(B+C)) as the tracking error signal TE=((A+D)−(B+C)), the correct tracking error signal TE cannot be obtained when the objective lens 65 is moved corresponding to the eccentricity of the optical disk 2.

Contrary to this, in the differential push-pull system shown in equation 1, there is the advantage that signals resulting from the positions of the spots on the photodetectors 671 to 673 cancel each other out when finding the difference of the push-pull signals and that only the correct tracking error signal TE shown in FIG. 6 is obtained.

As illustrated in FIG. 6, there are two positions of spots where the tracking error signal TE becomes 0, i.e., on a land and on a groove in the optical disk 2. Accordingly, since the positions of the spots cannot be differentiated by just the tracking error signal TE, a signal for discriminating between them becomes necessary. This signal is referred to as the cross track signal CTS. The method of calculation will be explained next.

As illustrated in FIG. 3, where the land width of the optical disk 2 is made wider than the groove width, as illustrated in FIG. 5, the sum signal (A+B+C+D) of the main spot becomes the largest on the land, and the smallest on the groove. By utilizing this relationship and finding the difference between the sum signal (A+B+C+D) of the main spot and the sum signal (E+F+G+H) of a side spot multiplied by an amplification gain α of the amount of the ratio of the amount of light (following equation 3), a cross track signal CTS with a phase advanced 90° relative to the tracking error signal TE illustrated in FIG. 6 is found.

$$CTS=(A+D+B+C)-\alpha(E+F+G+H) \quad (3)$$

Since the difference between the sum signal (A+D+B+C) of the main spot and the sum signal (E+F+G+H) of a side spot multiplied by the coefficient α is found for calculation of the cross track signal CTS, even if the total amounts of light received change at the positions of the spots etc. at the photodetectors 671 to 673, they cancel each other out and a cross track signal CTS with a high precision is obtained.

The tracking error signal TE is processed at the tracking error signal processor unit 675C illustrated in FIG. 3, the cross track signal CTS is processed at the cross track signal processor unit 675D, and the focus error signal FE is processed at the focus error signal processor unit 675B.

In the optical disk 2 illustrated in FIG. 3, the land width is wider than the groove width and data is recorded only in the grooves, but as one procedure for improving the recording density of the optical disk, the "land and groove recording method" which records data on both of the lands and grooves of the optical disk has been known.

Summarizing the problem to be solved by the invention, in order to optimize the recording and reproduction characteristic in the land and groove recording method, it is necessary to make the width of the lands and the width of the grooves the same.

In this case as well, the correct tracking error signal TE is obtained from the conditions of equation 1, but the sum signal of the side spot in the above explanation becomes equal on the lands and on the grooves as illustrated in FIG. 7 and a cross track signal CTS can no longer be generated by equation 3. Namely, the above method of calculation of a cross track signal cannot be used in the land and groove recording method for improving the recording density of the optical disk when the land width and the groove width are made the same. In other words, when the land width and the recording width are made the same in the land and groove recording method, the problem is encountered that the phase of the tracking error signal TE cannot be differentiated and pull-in in tracking control is not possible.

SUMMARY OF THE INVENTION

An object of the present invention is to provide a method and an apparatus capable of correctly generating not only a tracking error signal and focus error signal, but also a cross track signal—even in a case where the land width and the groove width are equal in the land and groove recording method used for improving the recording density of the optical disk.

Another object of the present invention is to provide an optical disk recording and reproducing apparatus improving the density of an optical disk by applying the above method and apparatus to an optical pick-up.

Still another object of the present invention is to provide an optical disk recording and reproducing method capable of control of the tracking servo from an off state to a tracking on state, i.e., so-called tracking pull-in control, using the tracking signal and cross track signal obtained by the above method.

In the present invention, the arrangement of the spots and the method of signal processing are tinkered with to enable not only the tracking error signal and focus error signal, but also the cross track signal to be correctly obtained even in the land and groove recording method in which the land width and the groove width are equal.

According to a first aspect of the present invention, there is provided a signal generation method for positioning a main spot to be radiated on an optical disk and side spots of the two sides of the main spot on lands and grooves of the optical disk, detecting the reflected light of the main spot and side spots, and calculating a track error signal and a cross track signal shifted by a predetermined phase relative to the track error signal, comprising detecting the reflected light of the main spot by a first photodetector split into four sections in the track direction and tangential direction of the optical disk, detecting the reflected light of a first side spot at one side of the main spot by a second photodetector split into two sections in the track direction of the optical disk, and detecting the reflected light of a second side spot at the other side of the main spot by a third split into two sections in the track direction of the optical disk and calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal.

The land width and the groove width in the optical disk may be equal and the side spots at the two sides of the main spot positioned exactly a predetermined distance of less than ½ of the land pitch away from the main spot in the radial direction of the optical disk.

Preferably, the side spots at the two sides of the main spot are positioned exactly a predetermined distance of ¼ of the land pitch away from the main spot in the radial direction of the optical disk.

Alternatively, the land width and the groove width in the optical disk may be different.

According to a second aspect of the present invention, there is provided such a signal generation method used for an optical disk recording and reproduction apparatus.

The cross track signal may be used for discrimination of the state of the tracking error signal.

Alternatively, the cross track signal and the tracking error signal may be used to calculates the speed of movement and position of an optical pick-up with respect to the optical disk.

In this case, the calculated speed of movement and position may be used for judging tracking pull-in.

Alternatively, the cross track signal and tracking error signal may be used for judgement of tracking pull-in.

According to a third aspect of the present invention, there is provided an optical pick-up for positioning a main spot to be radiated on an optical disk and side spots of the two sides of the main spot on lands and grooves of the optical disk, detecting the reflected light of the main spot and side spots, and calculating a track error signal and a cross track signal shifted by a predetermined phase relative to the track error signal, comprising a first photodetector split into four sections in the track direction and tangential direction of the optical disk and receiving the reflected light of the main spot, a second photodetector split into two sections in the track direction of the optical disk and receiving the reflected light of a first side spot at one side of the main spot, a third photodetector split into two sections in the track direction of the optical disk and receiving the reflected light of a second side spot at the other side of the main spot, an optical system for directing the main spot and the two side spots to the optical disk and leading the reflected light of the main spot and the side spots to the first to third photodetectors, and a signal processing means for calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal.

Preferably, further provision is made of a tracking coil and focus coil.

The land width and the groove width in the optical disk may be equal and the optical system may position the side spots at the two sides of the main spot exactly a predetermined distance of less than ½ of the land pitch away from the main spot in the radial direction of the optical disk.

Preferably, the optical system positions the side spots at the two sides of the main spot exactly a predetermined distance of ¼ of the land pitch away from the main spot in the radial direction of the optical disk.

The land width and the groove width in the optical disk may also be different.

According to a fourth aspect of the present invention, there is provided an optical disk recording and reproducing apparatus provided with an optical disk on which lands and grooves are formed adjoining each other in the radial direction; an optical pick-up able to move relative to the optical disk in the track direction of the optical disk; and a control means for tracking control of the optical pick-up with respect to the optical disk in accordance with a detection signal from the optical pick-up; the optical pick-up having a first photodetector split into four sections in the track direction and tangential direction of the optical disk and receiving the reflected light of the main spot, a second photodetector split into two sections in the track direction of the optical disk and receiving the reflected light of a first side spot at one side of the main spot, a third photodetector split into two sections in the track direction of the optical disk and receiving the reflected light of a second side spot at the other side of the main spot, an optical system for directing the main spot and the two side spots to the optical disk and leading the reflected light of the main spot and the side spots to the first to third photodetectors, and a signal processing means for calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal having a predetermined phase difference from the tracking error signal and the control means using the tracking error signal and cross track signal for tracking control.

Preferably, the signal processing means of the optical pick-up further calculates at least a focus error signal from the four signals of the first photodetector, the optical pick-up has a focus coil, and the control means uses the focus error signal for focus control.

The land width and the groove width in the optical disk may be equal and the side spots at the two sides of the main spot positioned exactly a predetermined distance of less than ½ of the land pitch away from the main spot in the radial direction of the optical disk.

Preferably, the side spots at the two sides of the main spot are positioned exactly a predetermined distance of ¼ of the land pitch away from the main spot in the radial direction of the optical disk.

The land width and the groove width in the optical disk may also be different.

The cross track signal may be used for discrimination of the state of the tracking error signal.

Alternatively, the cross track signal and the tracking error signal may be used to calculate the speed of movement and position of the optical pick-up with respect to the optical disk.

The speed of movement and position of the optical pick-up may be used for judgement of tracking pull-in.

The cross track signal and tracking error signal may also be used for judgement of tracking pull-in.

According to a fifth embodiment of the present invention, there is provided an optical disk recording and reproducing apparatus provided with an optical disk on which lands and grooves are formed adjoining each other in the radial direction; an optical pick-up able to move relative to the optical disk in the track direction of the optical disk; and a control means for tracking control of the optical pick-up with respect to the optical disk in accordance with a detection signal from the optical pick-up; the optical pick-up having a first photodetector split into four sections in the track direction and tangential direction of the optical disk and receiving the reflected light of the main spot, a second photodetector split into two sections in the track direction of the optical disk and receiving the reflected light of a first side spot at one side of the main spot, a third photodetector split into two sections in the track direction of the optical disk and receiving the reflected light of a second side spot at the other side of the main spot, an optical system for directing the main spot and the two side spots to the optical disk and leading the reflected light of the main spot and the side spots to the first to third photodetectors, and a tracking coil, the control means calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal having a predetermined phase difference from the tracking error signal and the control means using the tracking error signal and cross track signal for tracking control.

In short, the tracking error signal and cross track signal generated as explained above are used for the tracking control in the optical disk recording and reproducing apparatus.

For example, the cross track signal is used for the differentiation of the state of the tracking error signal. Further, the speed of movement and position of the optical pick-up with respect to the optical disk are calculated by using the cross track signal and the tracking error signal. The speed of movement and position calculated in this time are used to judge the tracking pull-in. Further, the tracking pull-in is controlled by using the cross track signal and the tracking error signal.

BRIEF DESCRIPTION OF THE DRAWINGS

The above objects and features of the present invention will be more apparent from the following description of the preferred embodiments given with reference to the accompanying drawings, wherein:

FIG. 17 is a graph illustrating waveforms of the tracking error signal TE and the cross track signal CTS indicating the timing for switching to the tracking servo in a control processor unit 8B illustrated in FIG. 16; and FIG. 18 is a block diagram illustrating details of a part related to center sensor servo control as a fifth embodiment in the optical disk recording and reproducing apparatus illustrated in FIG. 1.

DESCRIPTION OF THE PREFERRED EMBODIMENTS

Preferred embodiments of an optical pick-up and an optical disk recording and reproducing apparatus of the present invention will be explained next by referring to the attached drawings.

First Embodiment

As a first embodiment of the present invention, an explanation will be given of calculation of a tracking error signal and a cross track signal by the differential push-pull system used in an optical disk recording and reproducing apparatus using the "land and groove recording method" where the lands and grooves are arranged with equal widths and data recorded at both the lands and grooves can be reproduced and an optical pick-up using the same.

Figure 1:
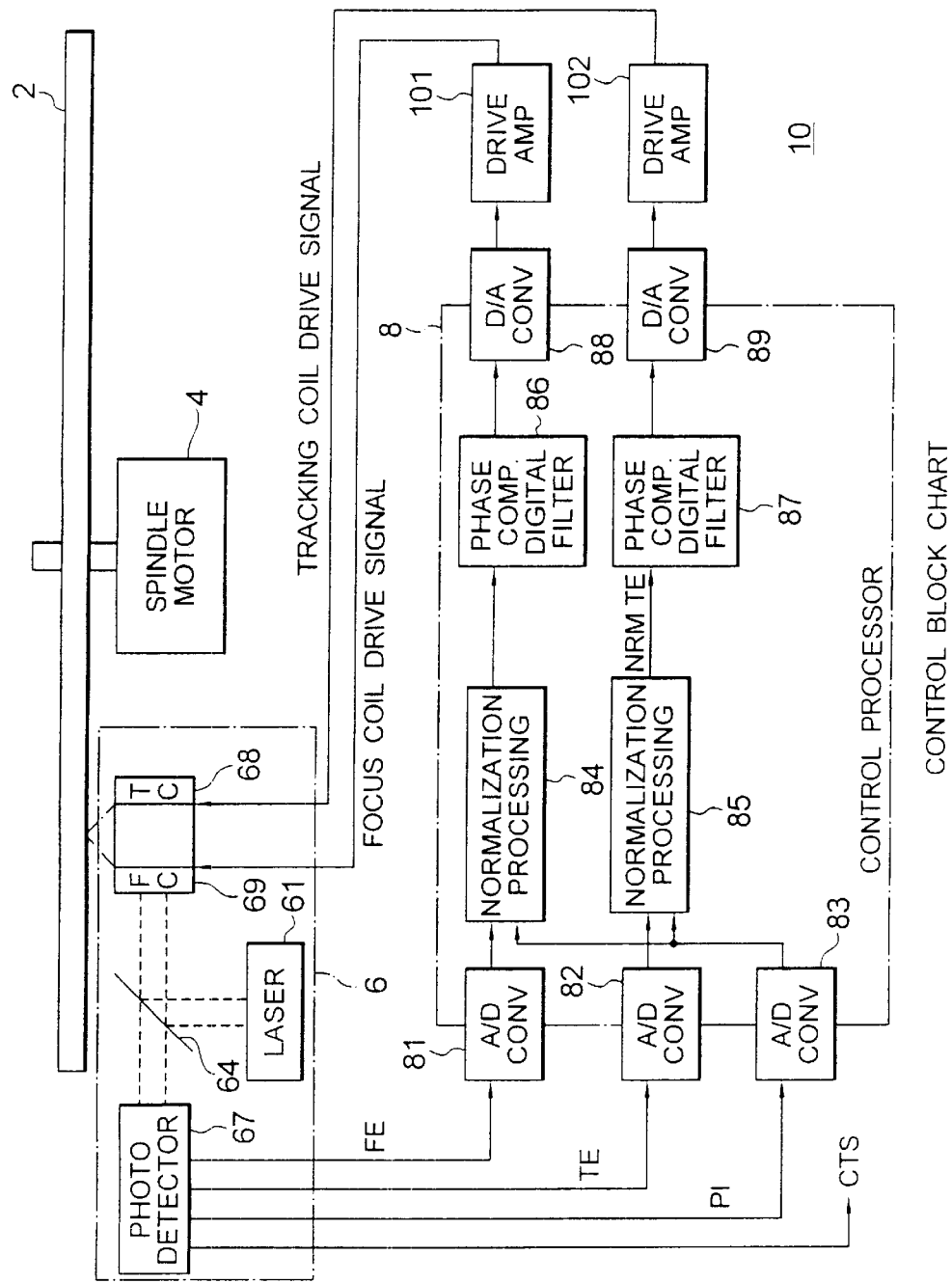
FIG. 1 is a schematic view of the configuration of an optical disk recording and reproducing apparatus of a differential push-pull system.
Figure 2:
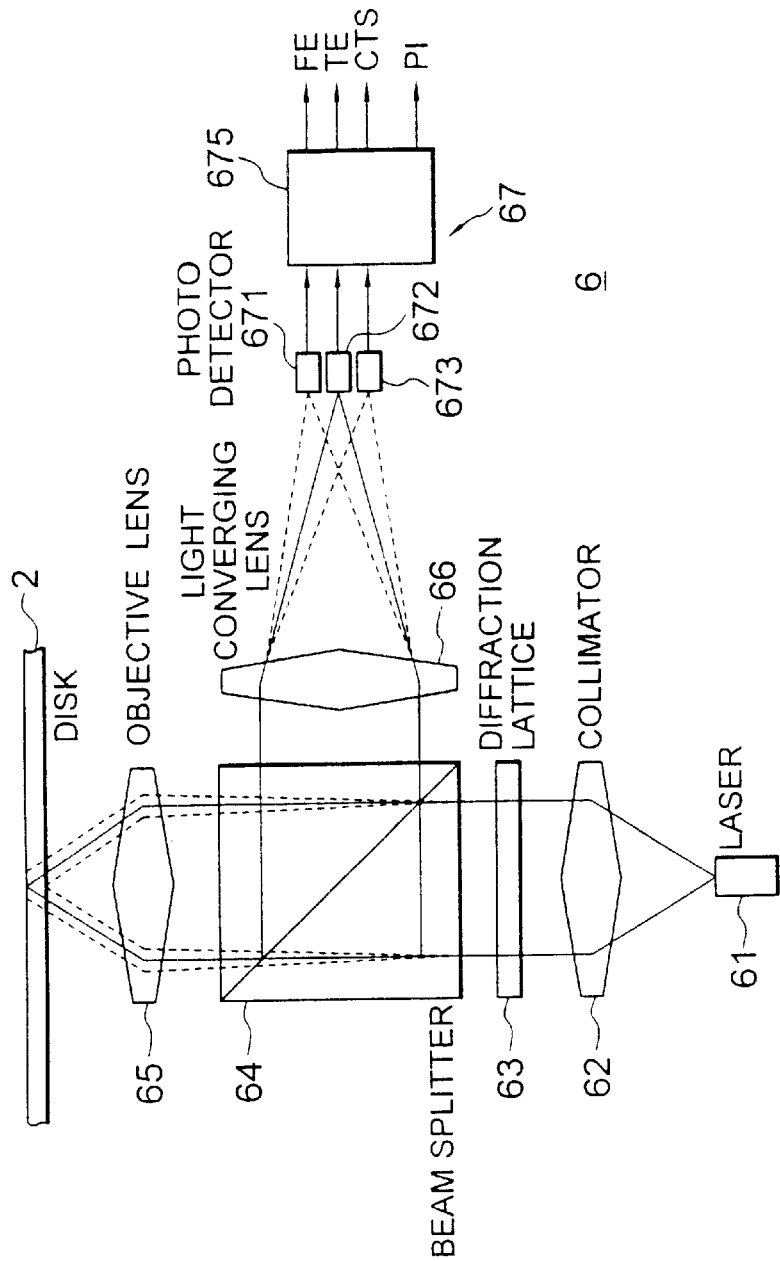
FIG. 2 is a view of the configuration of an optical system of an optical pick-up illustrated in FIG. 1.

The configuration of the optical disk recording and reproducing apparatus of the differential push-pull system is shown in FIG. 1, while the configuration of the optical pick-up 6 in FIG. 1 is shown in FIG. 2.

The configuration of the optical disk recording and reproducing apparatus of the differential push-pull system illustrated in FIG. 1 and the configuration and operation of the optical pick-up illustrated in FIG. 2 were explained above and are the same in the present embodiment, so will not be explained again here.

Figure 3:
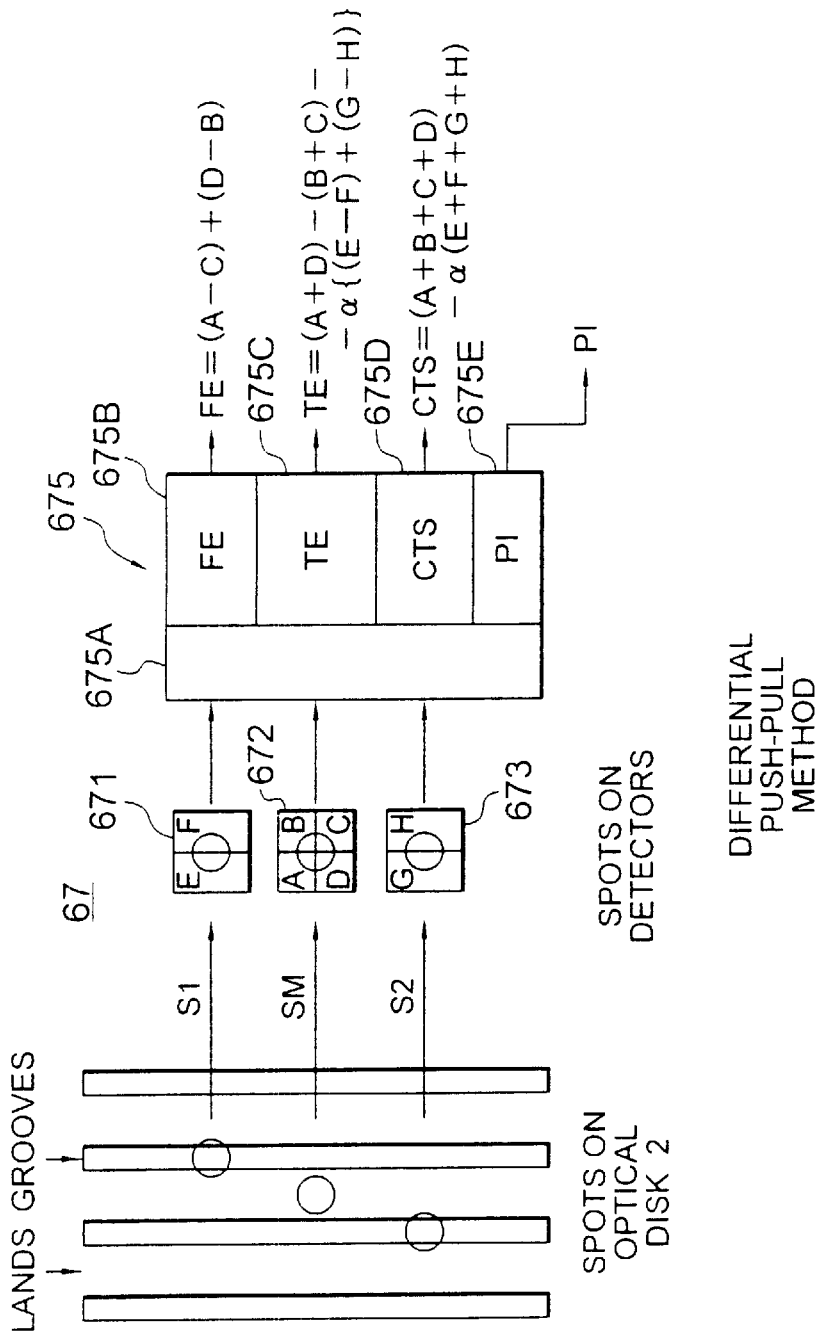
FIG. 3 is a view illustrating beams of light (spots) on lands and grooves of an optical disk and a method of receiving reflected light via the optical pick-up illustrated in FIG. 2 and calculating a tracking error signal and a cross track signal in a photodetector and processor unit where the land width and the groove width in the optical disk are different.
Figure 4:
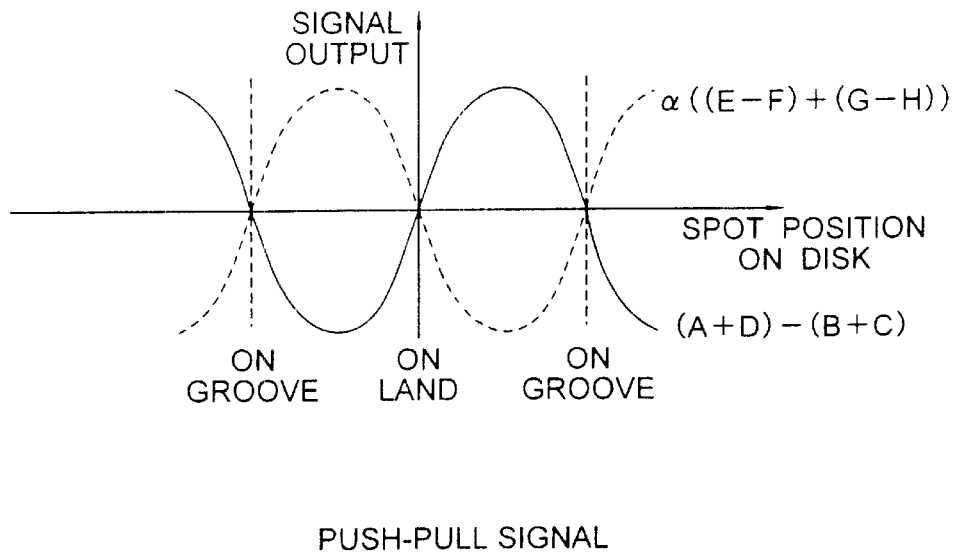
FIG. 4 is a waveform diagram of a push-pull signal in the relationship of the lands and grooves illustrated in FIG. 3.
Figure 5:
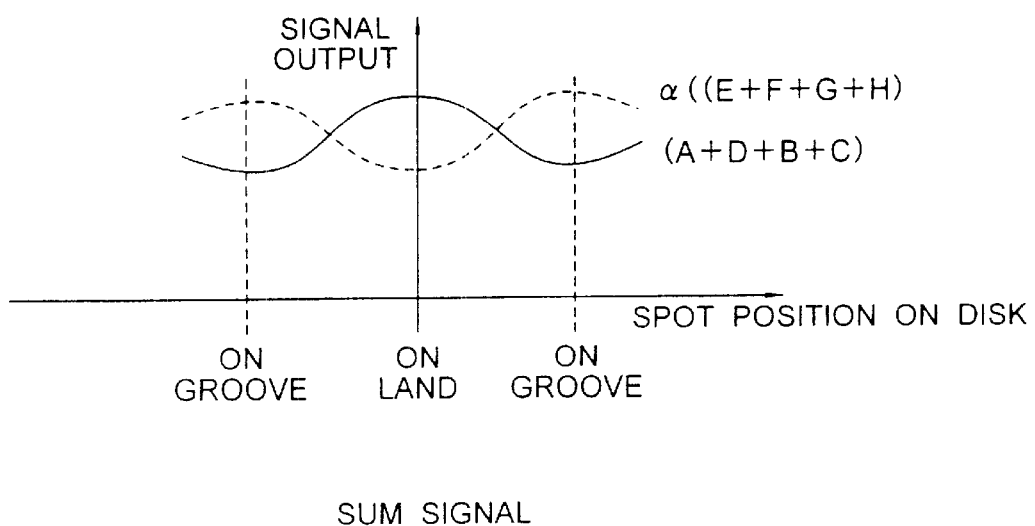
FIG. 5 is a waveform diagram of a sum signal in the relationship of the lands and grooves illustrated in FIG. 3.
Figure 6:
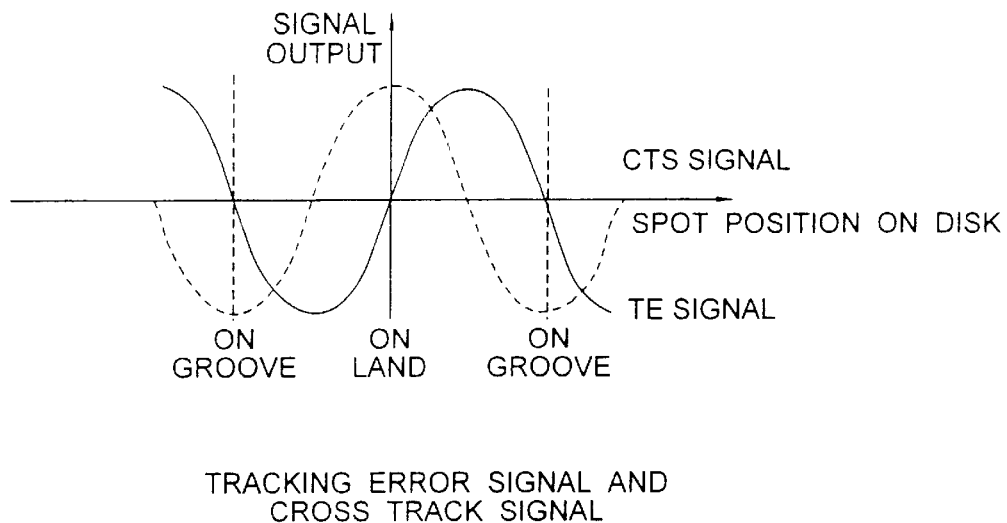
FIG. 6 is a waveform diagram of the tracking error signal and the cross track signal in the relationship of the lands and grooves illustrated in FIG. 3.
Figure 7:
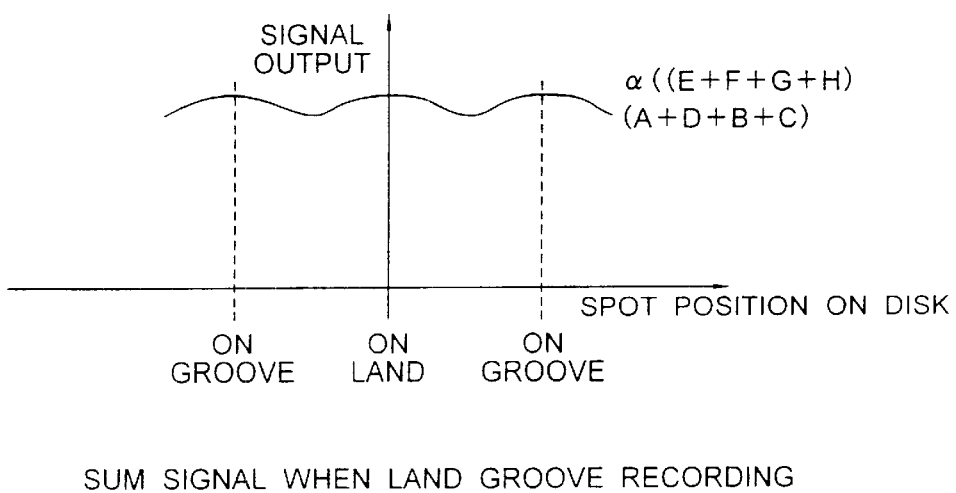
FIG. 7 is a waveform diagram of the sum signal where land and groove recording is applied in the relationship of the lands and grooves illustrated in FIG. 3.

In the present embodiment, the positions of the spots on the optical disk 2 are different from the positions of the spots illustrated in FIG. 3. The positions of the spots on the optical disk 2 in the present embodiment are illustrated in FIG. 8.

The projection portions (lands) and guide grooves (hereinafter referred to as the "grooves") illustrated in FIG. 8 can be used for the "land and groove recording method" for recording data on both of the lands and grooves of the optical disk as one means for improving the recording density of the optical disk. Further, the width of the lands and the width of the grooves are made the same in order to optimize the recording and reproduction characteristics.

Figure 8:
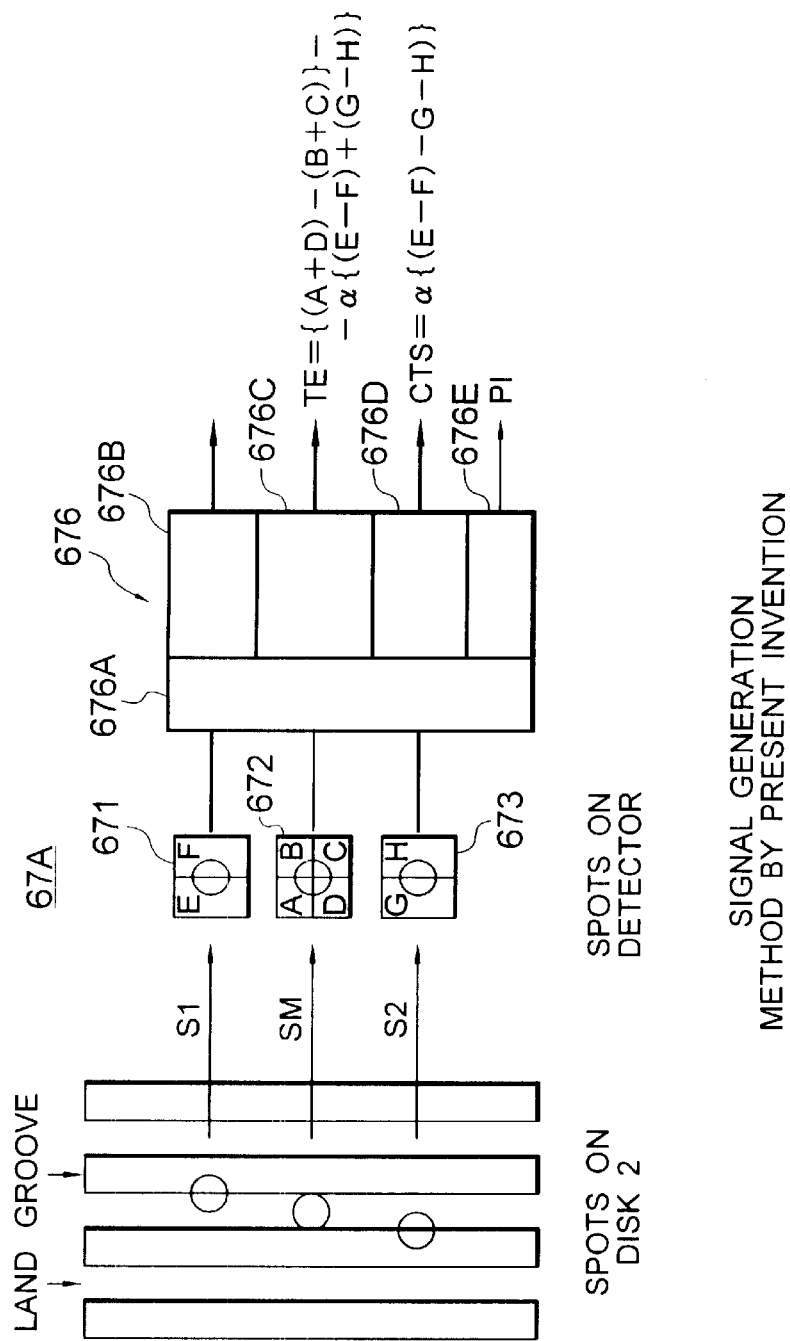
FIG. 8 is a view for explaining the generation of the tracking error signal and the cross track signal in the case where the land width and the groove width in the optical disk are equal—which can be applied to land and groove recording—as an embodiment of the present invention.

The present embodiment provides a method for not only calculating a tracking error signal TE and focus error signal FE, but also generating a cross track signal CTS having a phase difference of 90° relative to the tracking error signal TE even if using the differential push-pull system when the land width and the groove width in the optical disk 2 illustrated in FIG. 8 are the same and provides an optical pick-up using the same.

When arranging spots as shown in FIG. 8, a single beam of laser light emitted from the laser 61 in the optical pick-up 6 illustrated in FIG. 2 is diffracted at the diffraction lattice 63 to obtain three beams. The three beams of light become these three spots, that is, the main spot SM and two side spots S1 and S2 located at the two sides of this main spot SM, on the optical disk 2.

Here, the two side spots S1 and S2 in the optical disk 2 are arranged shifted by exactly a predetermined pitch of less than ½ of the land pitch, for example, ¼, in the radial direction (track direction) of the optical disk 2 with respect to the main spot SM.

So long as the two side spots S1 and S2 are arranged shifted by less than ½ of the land pitch in the radial direction of the optical disk 2 with respect to the main spot SM, they can be shifted by any exact pitch. The relationship between the amount of shift and the tracking error signal TE and cross track signal CTS will be explained later, but a case where the two side spots S1 and S2 are arranged shifted by exactly a ¼ pitch of the land pitch with respect to the main spot SM in the radial direction of the optical disk 2 will be explained as an example.

The photodetector and processor unit 67A illustrated in FIG. 8 has photodetectors 671 to 673 and a signal processor unit 676.

The photodetectors 671 to 673 are substantially the same as the photodetectors 671 to 673 illustrated in FIG. 3. Namely, the main photodetector 672 at the center is a split photodetector having a total of four sections, i.e., two sections in the radial direction of the optical disk 2 and two in the circumferential direction (tangential direction) of the optical disk 2. Each of the side photodetectors 671 and 673 comprises a split photodetector having two sections in the radial direction of the optical disk 2. These receive the light from the side spots S1 and S2 at the two sides of the main spot and convert the same to electric signals.

The signal processor unit 676 has the signal input unit 676A for receiving as its inputs the signals from the photodetectors 671 to 673, a focus error signal processor unit 676B for calculating the focus error signal FE from the input signals, a tracking error signal processor unit 676C for calculating the tracking error signal TE from the input signals, a cross track signal processor unit 676D for calculating the cross track signal CTS from the input signals, and a sum signal processor unit 676E for calculating the sum signal PI from the input signals. These processor units 676A to 676E have configurations resembling to that of the signal processor unit 675 illustrated in FIG. 3, but differ in which the processing of the cross track signal CTS as will be explained below.

Note that, the processing in the signal processor unit 676 can be carried out in the control processor unit 8, but in the present embodiment, a case where it is carried out at the photodetector and processor unit 67A located in front of the control processor 8 will be explained.

Figure 9:
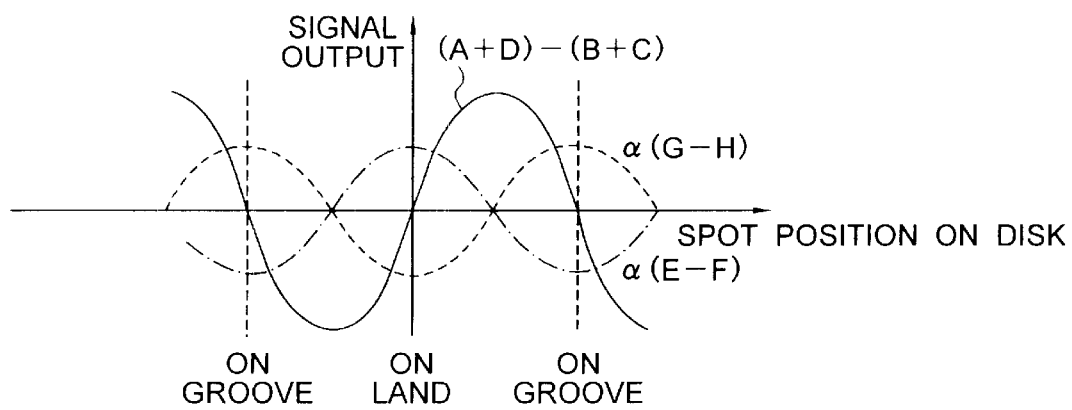
FIG. 9 is a waveform diagram of a push-pull signal in the relationship of the lands and grooves illustrated in FIG. 8.

FIG. 9 is a waveform diagram of the positional relationship between the main spot and the side spots illustrated in FIG. 8, the differential push-pull signal (A+D)−(B+D) in the track direction for the main spot, and the differential push-pull signals α (E−F) and α (G−H) in the track direction of the first and second side spots under the conditions of the lands and grooves in the optical disk 2. In FIG. 9, the abscissa indicates the positions of the spots on the optical disk 2, that is, the positions in the tracking direction, and the ordinate indicates the amplitudes of the differential push-pull signals.

Below, the differential push-pull signal of the main spot will be referred to as the main push-pull signal, and the differential push-pull signals of the side spots will be referred to as the side push-pull signals.

In FIG. 9, the main push-pull signal is indicated by a solid line, while the first and second side push-pull signals are indicated by a broken (dotted) line and a one-dot chain line.

As clear from the waveforms illustrated in FIG. 9, the main push-pull signal and the first and second side push-pull signals are shifted in phase 90° relative to the positions in the tracking direction.

The first and second side push-pull signals have an inverse phase relationship, that is, are shifted in phase by 180° from each other. Accordingly, the side push-pull signals cancel each other out ((E−F)+(G−H)) and the sum becomes 0 when tracking control is carried out perfectly.

The sum of the side push-pull signals is amplified by the amount of the ratio of the amounts of light with respect to the main spot (amplification gain defined as α) and the difference from the main push-pull signal (A+D)−(B+D) is found to find the tracking error signal TE shown in equation 4.

Namely, the side push-pull in the present embodiment is used for cancelling out the signals based on the positions of the spots on the photodetectors 671 to 673;

$$TE \approx ((A+D)-(B+C))-\alpha((E-F)+(G-H)) \quad (4)$$

The arrangement of the spots illustrated in FIG. 8 is different from the arrangement of the spots illustrated in FIG. 3, but the signal processing for finding the tracking error signal TE is the same as that of the differential push-pull system explained above. Accordingly, in the present embodiment as well, the signals due to the positions of the spots on the photodetectors 671, 672, and 673 of the photodetector and processor unit 67A are processed at the tracking error signal processor unit 676C of the signal processor unit 676 based on equation 4 to calculate the tracking error signal TE.

The coefficient α is the coefficient (gain) multiplied with for level adjustment of the main push-pull signal and the side push-pull signals.

This tracking error signal TE indicates the accurate tracking error obtained by cancellation of the signals due to the positions of the spots on the photodetectors 671, 672, and 673.

Equation 4 is the same as equation 1, but the tracking error signal TE processed in the tracking error signal processor unit 676C differs in its amplitude from the tracking error signal explained above. Namely, in the above differential push-pull system, the tracking error component was contained in the push-pull as well, therefore the tracking error signal had an amplitude two times that of the main push-pull. However, in the present embodiment, the amplitudes of the side push-pull signals are the same as the amplitude of the main push-pull signal, so the magnitude (amplitude) of the tracking error signal TE in the present embodiment becomes about a half of that explained above.

The cross track signal CTS processed in the cross track signal processor unit 676D is generated as the difference between the first and second side push-pull signals as will be shown in the following equation:

$$CTS=\alpha((E-F)-(G-H)) \quad (5)$$

In this way, in the present embodiment, the tracking error signal TE is calculated based on an equation similar to that of the related art, and the cross track signal CTS can be found by a simple equation. The focus error signal FE is calculated in the same way as in the related art.

Figure 10:
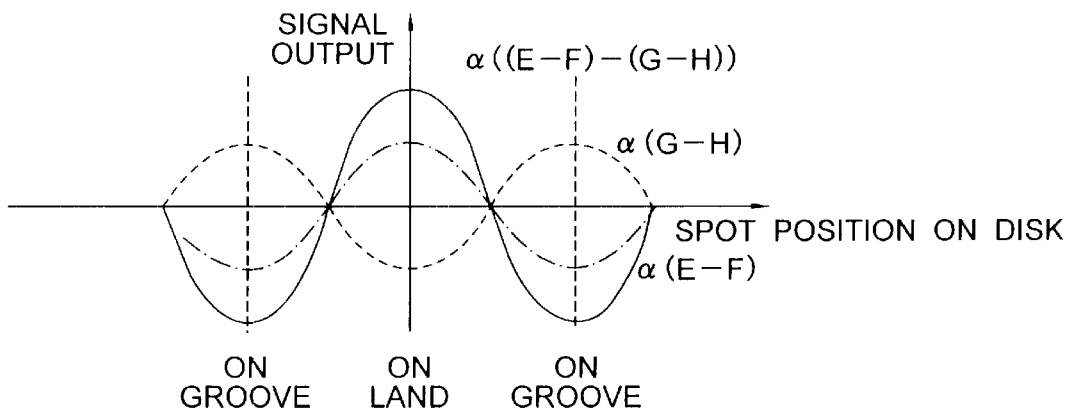
FIG. 10 is a waveform diagram of a side push-pull signal and the cross track signal in the relationship of the lands and grooves illustrated in FIG. 8.

As shown in FIG. 10, the value ((E–F)–(G–H)) obtained by subtracting the push-pull signal (G–H) of the second side spot S2 from the push-pull signal (E–F) of the first side spot S1 becomes maximum when the main spot SM is located on a land of the optical disk 2, while becomes minimum when the main spot SM is located on a groove of the optical disk 2. It becomes an equivalent signal to the cross track signal CTS in the related art not using the land and groove recording method.

Since the cross track signal CTS according to the present embodiment is the difference of the side push-pull signals, in the same way as the tracking error signal TE, signals due to the positions of the spots on the photodetectors 671 to 673 are cancelled out and only the cross track signal is obtained.

In this way, according to the present embodiment, an accurate cross track signal CTS with a phase correctly shifted by 90° from the tracking error signal TE is obtained even in an optical disk recording and reproducing apparatus using the land and groove recording method where the land width and the groove width are equal. This cross track signal CTS can be used for discriminating the state of the tracking error signal TE.

Of course, in the present embodiment, the tracking error signal TE and focus error signal FE can also be calculated from for example the difference of the detection signals of the diagonal positions of the split photodetector 672 in the same way as the case not using the land and groove recording method.

Modification

In the above embodiment, the explanation was given of the case where the side spots were shifted by exactly ¼ of the side pitch in the radial direction of the optical disk 2, but the present invention is not limited to the above example. Another arrangement can be adopted too so far as the amount of the shift is less than ½ of the track pitch.

For example, the amplitude of the cross track signal CTS becomes maximum when a side spot is shifted by ¼ pitch, and becomes 0 when it is shifted by ½ pitch. Further, the amplitude of the tracking error signal TE becomes minimum when a side spot is shifted by ¼ pitch and becomes maximum, i.e., twice, when it is shifted by ½ pitch. The pitch arrangement can be changed in this way in accordance with the S/N ratio of the cross track signal CTS and the tracking error signal TE. In this way, according to the embodiments of the present invention, signals required in the optical disk recording and reproducing apparatus such as the tracking error signal TE, cross track signal CTS, and the focus error signal FE are obtained. Note that when the positions of the spots are changed, the amplitudes of the tracking error signal TE and the cross track signal CTS change.

In any case, there is always a 90° phase difference between the tracking error signal TE and the cross track signal CTS, so the cross track signal CTS can be used for discrimination of the state of the tracking error signal TE (discrimination of whether it is a land position or a groove position). It must be noted that no phase difference is created between the tracking error signal TE and the cross track signal CTS even if there is an error in the position of the diffraction lattice 63 mounted on the optical pick-up 6 determining the positions of the spots. Accordingly, according to the present embodiment, a high precision tracking error signal TE and cross track signal CTS can always be obtained.

Above, an explanation was made of an example where the correct cross track signal CTS and tracking error signal TE are obtained even in a case where the land and groove recording method, where the land width and the groove width are equal, is used for the optical disk recording and reproducing apparatus as a preferred embodiment of the present invention, but it must be noted that the present invention is not limited to only the land and groove recording method where the land width and the groove width are equal. It can also be applied to a case where the land width and the groove width are different explained as the related art. Also, in this case, the state where the above characteristics, that is, the fact that the tracking error signal TE and the cross track signal CTS have a relationship of 90° C. phase and that the cross track signal CTS and the tracking error signal TE are correctly obtained even if the positions of the spots or the position of the diffraction lattice 63 etc. are shifted, are also maintained in the case where the land width and the groove width are different.

Accordingly, the present invention can be applied to not only an optical pick-up of an optical disk recording and reproducing apparatus using the land and groove recording method explained as the embodiment of the present invention, but also an optical pick-up of an optical disk recording and reproducing apparatus not using the land and groove recording method explained as the related art.

The tracking error signal TE and the cross track signal CTS according to the present embodiment can be used in for example a traverse counter at the time of a pull-in servo in tracking and a seek operation in various optical disk recording and reproducing apparatuses regardless of whether or not it they use the land and groove recording method. The tracking control using the tracking error signal TE and the cross track signal CTS found according to the present embodiment will be explained later.

The method of calculation of the focus error signal FE in the focus error signal processor unit 676B and the focus control using the focus error signal FE are not the themes of the present invention, therefore the descriptions of them were simplified, but the above problem does not occur in the focus direction. In the present invention, the focus error signal FE can be calculated and the focus control can be carried out in the same way as in the related art.

Second Embodiment

As a second embodiment of the present invention, an example in which the present invention is applied to the tracking pull-in and tracking control in an optical disk recording and reproducing apparatus using the optical pick-up according to the first embodiment and the tracking error signal TE and cross track signal CTS will be explained by referring to FIG. 11 and FIG. 12.

Figure 11:
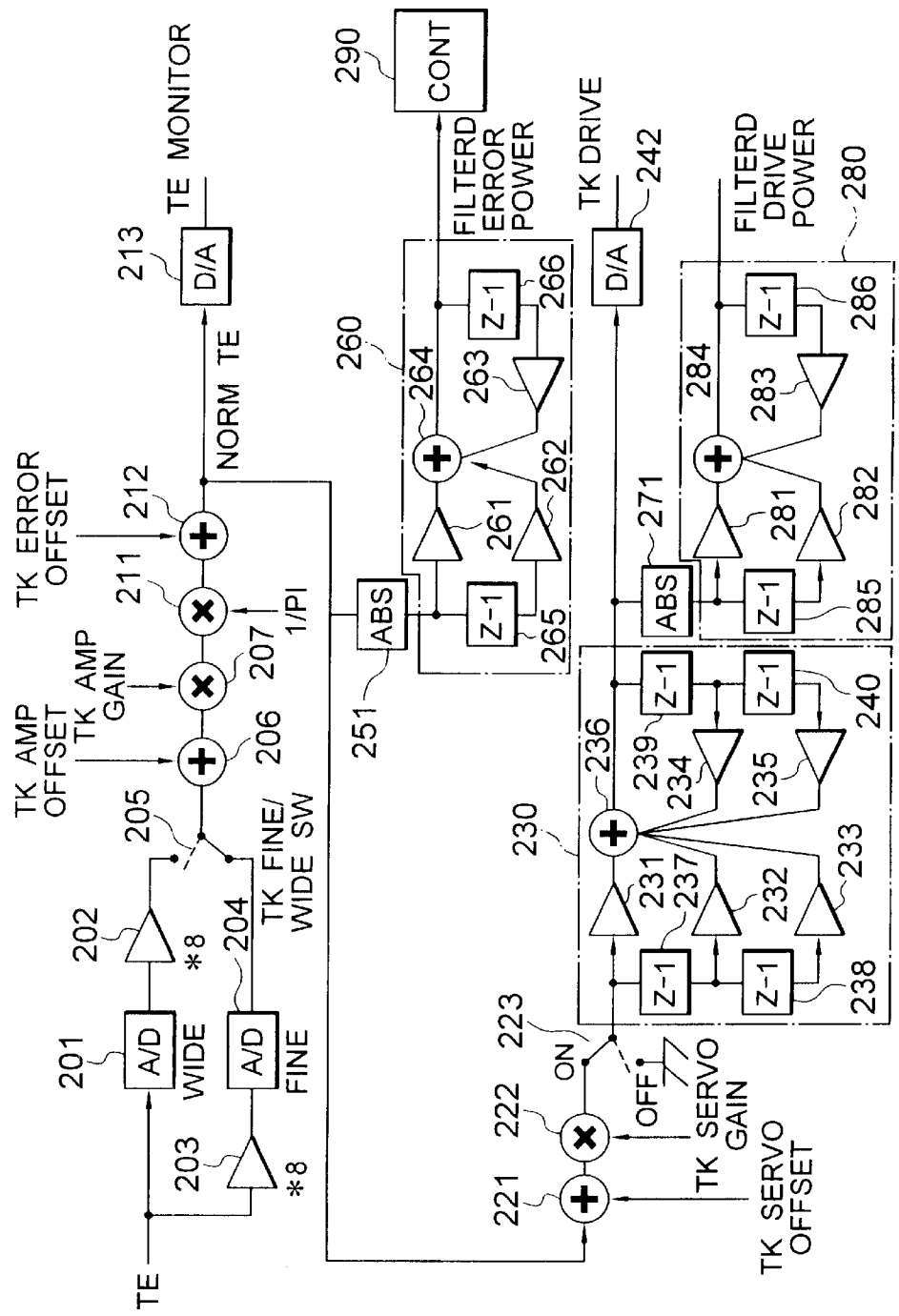
FIG. 11 is a block diagram of a normal tracking loop in an optical disk recording and reproducing apparatus according to a second embodiment of the present invention.

FIG. 11 is a block diagram of a normal tracking control loop in the optical disk reproducing apparatus according to the second embodiment of the present invention. Namely, FIG. 11 illustrates the normal tracking control processor unit in the control processor unit 8 illustrated in FIG. 1.

Figure 12:
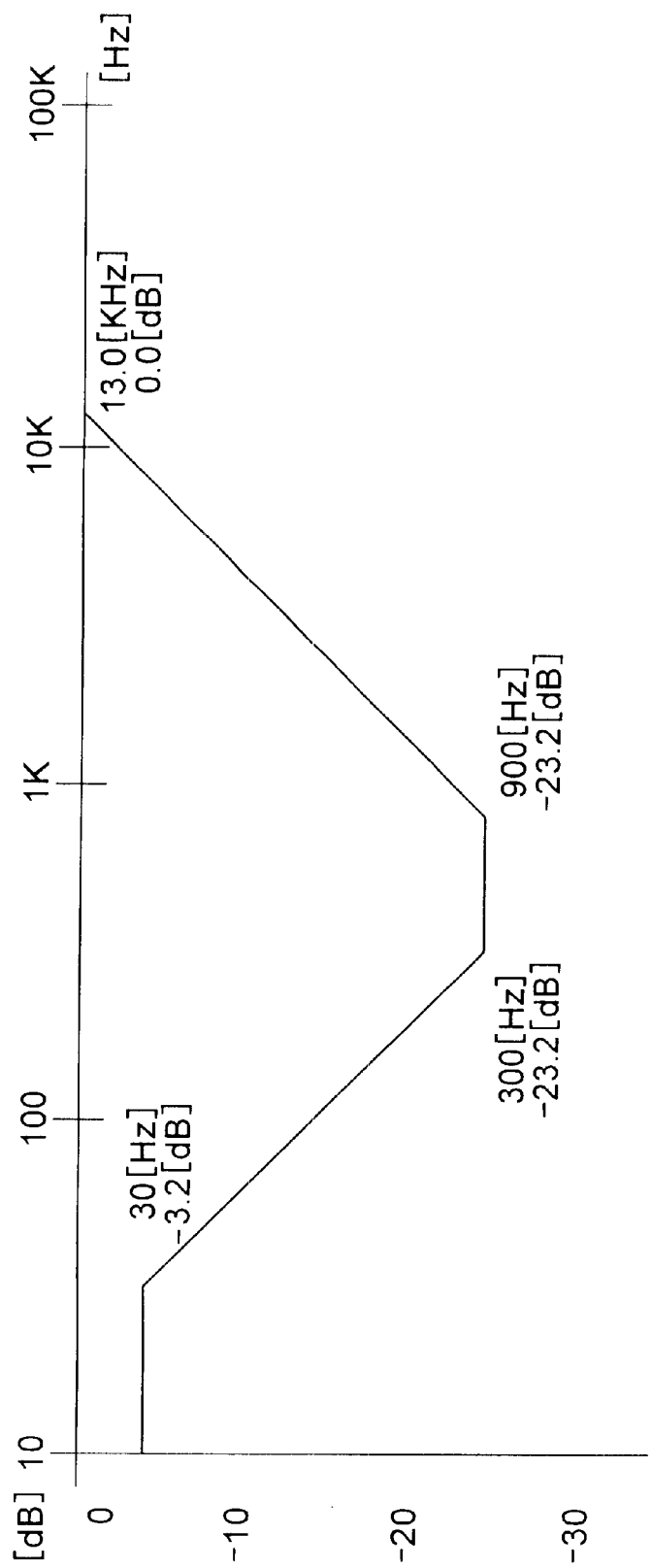
FIG. 12 is a graph of an example of phase compensation in a phase compensation filter of FIG. 11.

FIG. 12 is a graph of the phase compensation characteristic of the phase compensation filter in FIG. 11.

The detailed processing in the A/D converter 82 illustrated in FIG. 1 will be explained by referring to FIG. 11. In other words, specifically the circuit illustrated as the A/D converter 82 in FIG. 1 has the following configuration and performs the following operation.

The tracking error signal TE calculated in the photodetector and processor unit 67A (FIG. 8) of the optical pick-up 6 according to the first embodiment is applied to a wide side (rough control side) A/D converter 201 where it is converted to a digital signal. The tracking error signal TE is also supplied to a fine side (precise control side) amplifier 203 where it is amplified by a predetermined ratio, for example 8X, and then is converted to a digital signal at an A/D converter 204. The tracking error signal A/D converted at the fine side channel A/D converter 204 is checked to see whether it is the minimum value or the maximum value. When it is either the minimum value or maximum value, it is regarded as not being a normal signal, a switch 205 is turned to the broken line side, and data obtained by multiplying the value converted at the wide side channel A/D converter 201 by 8 at a multiplier 202 is output from the switch 205. When the tracking error signal converted at the A/D converter 204 is within the range of the minimum value to the maximum value, the switch 205 is turned to the solid line side and the tracking error signal converted at the A/D converter 204 is output from the switch 205. Namely, whether the spot 205 is fine or wide is selected in accordance with the value of the tracking error signal.

A track amplification offset TK AMP OFFSET is added to the tracking error signal output from the switch 205 at an adder 206. The value of the track amplification offset TK AMP OFFSET is defined as the adjustment value which becomes most stable at the time of change of the amount of the light to the optical disk 2 from the objective lens 65 in the optical pick-up 6 or at the time of change of the amount of the light received at the photodetectors 671 to 673 from the optical disk 2. The offset of the tracking error signal is corrected by this value at the adder 206.

A multiplier 207 multiplies the gain correction coefficient TK AMP GAIN with the output value of the adder 206 in order to correct the amplification gain to give a standard value, for example, 0x2000 at a traverse pp.

The above is an operation corresponding to the A/D converter 82 illustrated in FIG. 1.

Next, details of the normalization of the part corresponding to the normalization circuit 85 of FIG. 1 will be explained.

The normalization circuit 85 performs normalization by dividing the sum signal PI by the tracking error signal. In the circuit illustrated in FIG. 11, a multiplier 211 multiplies 1/PI with the output of the multiplier 207. Next, the adder 212 adds an offset correction value TK ERROR OFFSET so that the traverse center becomes 0. The result of this processing will be referred to as a normalized tracking error signal NRM TE.

The normalized tracking error signal NRM TE is converted to an analog signal at the monitor use D/A converter 213 and output to an external portion as a tracking error monitor signal TE MONITOR.

The normalized tracking error signal NRM TE is also supplied to portions of the control processor unit 8 explained below.

An adder 221 adds a tracking servo offset TK SERVO OFFSET to the normalized tracking error signal NRM TE to correct the offset.

A multiplier 222 adjusts the gain so that the loop gain becomes a predetermined frequency f0, for example, f0=3.0 (kHz), by adding a tracking servo gain adjustment value TK SERVO GAIN.

In the tracking on state, the correction value in the multiplier 222 is selected and output from a switch 223. In the tracking off state, the switch 223 is set to the broken line position and a ground voltage is selected and output.

Next, phase compensation is carried out in a phase compensation filter 230 corresponding to the phase compensation digital filter 87 of FIG. 1.

The phase compensation filter 230 is a recursive filter comprised of coefficient multipliers 231 to 235, an adder 236, and unit time delay circuits 237 to 240 connected as illustrated and compensates the phase of the signal output from the switch 223. An example of the phase compensation of the tracking servo is shown in the graph of FIG. 12.

The area referred to as a ROM area of the optical disk 2 does not correctly output the servo signal. In this case, an error free (0x0000) signal is input from the switch 223 to hold the output.

The output data of the phase compensation filter 230 is given the offset as illustrated in FIG. 12, supplied to a D/A converter 242 (corresponding to the D/A converter of FIG. 1) where it is converted to an analog signal, passes through the drive amplifier 102 as a tracking drive signal TK DRIVE, and is supplied to the tracking coil 68.

The absolute value of the output of the phase compensation filter 230 is calculated at an absolute value calculation unit 271 and then filtered at the recursive filter 280.

The recursive filter 280 is constituted by multipliers 281 to 283, an adder 284, and unit delay circuits 285 and 286.

The judgement of tracking lock (tracking synchronization) requires some ingenuity.

In tracking servo control, there is no signal which can be used for judgement of a lock like the sum signal PI in the focus servo control.

A tracking error signal TE is a signal which changes from DC up to a predetermined frequency, for example 700 kHz and may exceeds the range of a Nyquist frequency. Further, when a spot is on the mirror surface of the optical disk 2, the tracking error signal TE may always become close to 0.

Therefore, the absolute value of the normalized tracking error signal NRM TE output from an adder unit 212 is found at an absolute value calculation circuit 251, a recursive filter 260 performs filtering adapted to a low pass filter of a predetermined frequency, for example, 500 Hz, and a tracking error power signal FALTERED ERROR POWER is calculated.

The recursive filter 260 is comprised of by multipliers 261 to 263, an adder 264, and unit delay circuits 265 and 266.

The tracking error power signal FILTERED ERROR POWER is used for judgement of the tracking lock in the control decision unit 290.

Further, although not illustrated in FIG. 11, the control decision unit 290 detects whether the pick-up traverses with a high frequency exceeding the Nyquist frequency by using the traverse counter.

By utilizing these, the control decision unit 290 decides that the tracking is locked by confirming that sate where the focus has locked, the amount of the light returned from the optical disk 2 is at least a predetermined value, for example, 30%, the drive current supplied from the drive amplifier 102 to the tracking coil 68 is less than a predetermined value, for example, an average 380 mA, a traverse of more than a predetermined frequency, for example, 15 kHz, has not been detected, and the tracking error is less than a predetermined value, for example, ±17.5%, continues for more than a predetermined time, for example 200 $\mu$sec.

Conversely, the control decision unit 290 decides the traverse is not locked if a state where the focus is unlocked, the amount of the returned light is less than a predetermined value, for example, 35%, the drive current is more than a predetermined value, for example, an average 400 mA, a traverse is not detected, or the tracking error is more than a predetermined value, for example, ±20.0%, is detected for more than a predetermined time, for example, 200 $\mu$sec. Further, when it does continue for more than a predetermined time, for example, 200 μsec, it abandons the tracking servo control and enters the pull-in servo mode.

In the present embodiment, in this way, it is made possible to prevent the tracking servo mode from erroneously continuing and the members (biaxial devices) mounted on the optical pick-up 6 from being scratched.

Third Embodiment

As a third embodiment of the present invention, an explanation will be given of the pull-in servo control in the tracking control by referring to FIG. 13 to FIG. 15.

In particular, in the present embodiment, the case will be explained of pull-in from a state where a track is not being traced.

Figure 13:
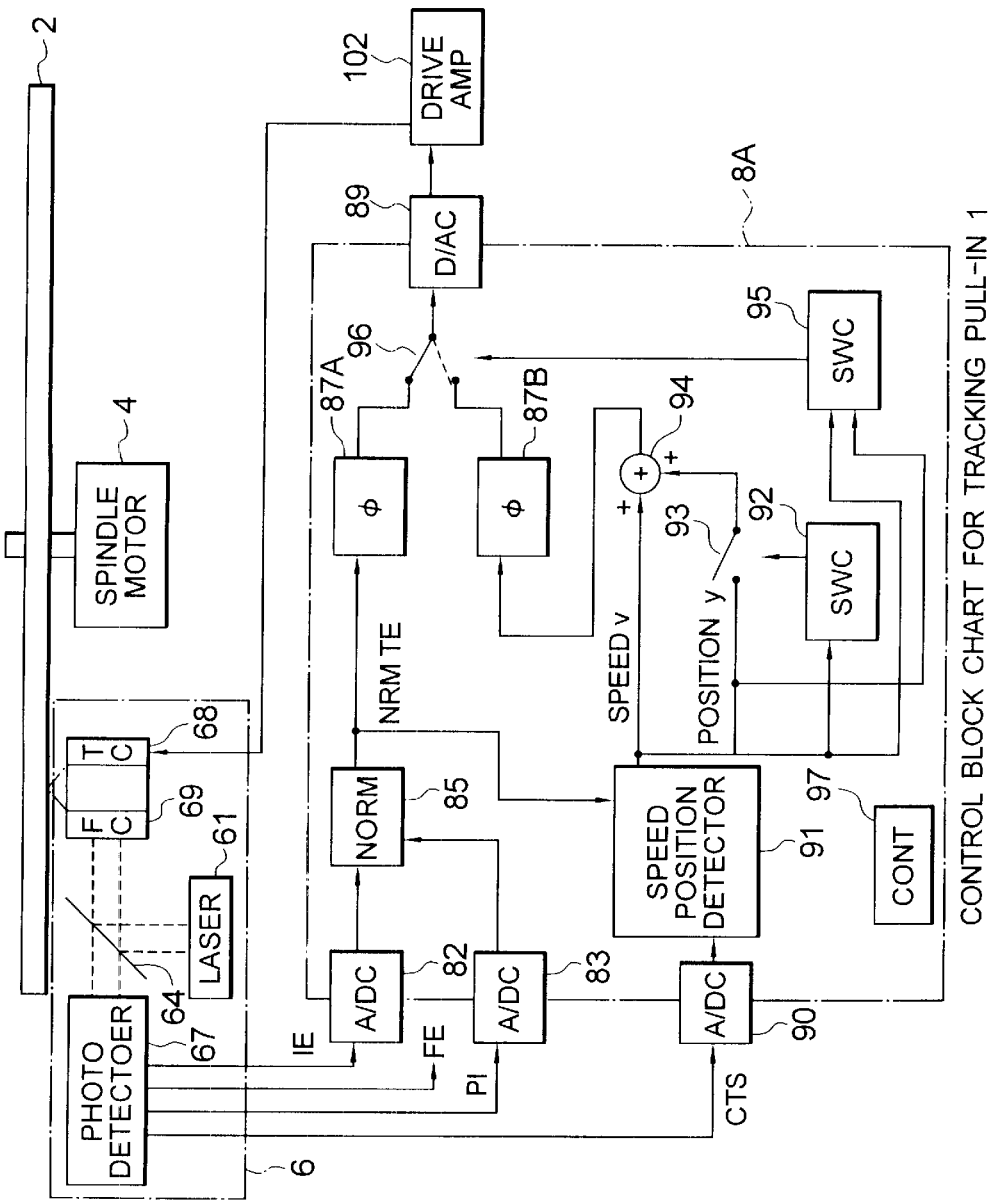
FIG. 13 is a block diagram illustrating details of a part related to pull-in servo where the tracking is pulled in from a state where the track is not traced according to a third embodiment in the optical disk recording and reproducing apparatus illustrated in FIG. 1.

FIG. 13 is a block diagram illustrating details of the part related to the pull-in servo control in the case of pull-in from a state where a track is not traced in the optical disk recording and reproducing apparatus illustrated in FIG. 1.

Figure 14:
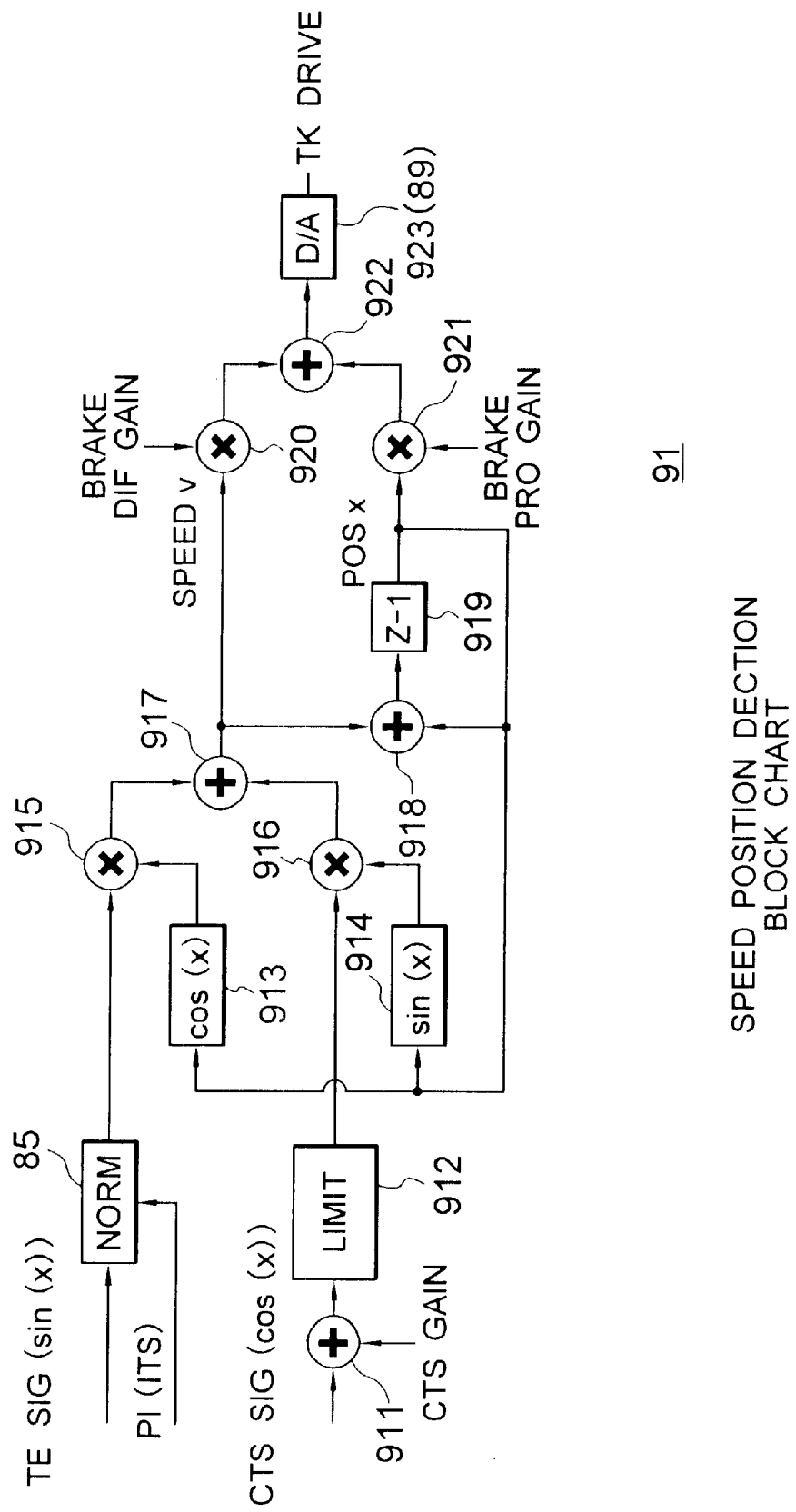
FIG. 14 is a detailed block diagram of the configuration of a speed and position detector unit illustrated in FIG. 13.

FIG. 14 is a detailed block diagram of the configuration of the speed and position detector unit illustrated in FIG. 13.

Figure 15:
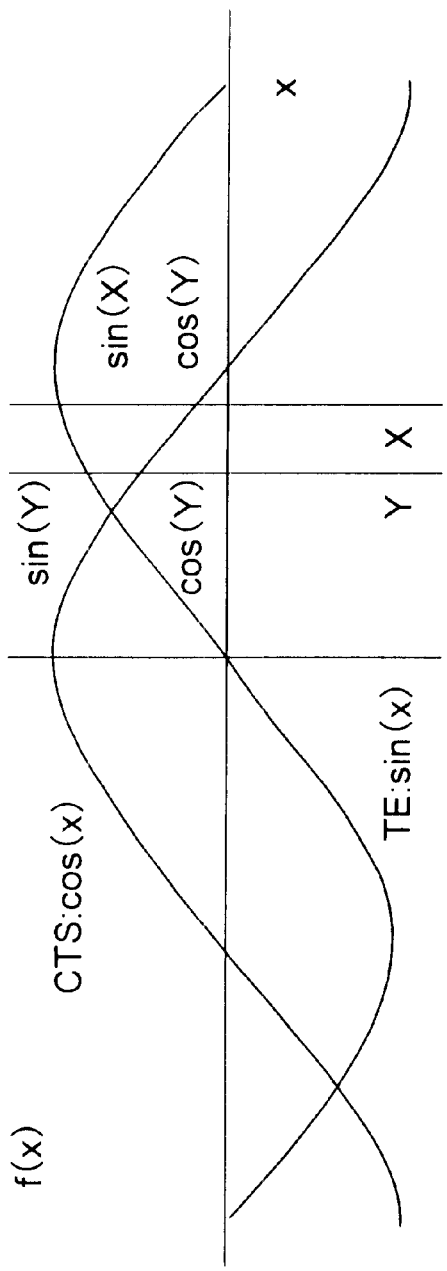
FIG. 15 is a graph illustrating waveforms of the tracking error signal TE and the cross track signal CTS in the third embodiment.

FIG. 15 is a graph illustrating the waveforms of the tracking error signal TE and the cross track signal CTS.

The optical disk 2, spindle motor 4, and optical pick-up 6 illustrated in FIG. 13 are similar to those explained in the first embodiment.

The control processor unit 8A illustrated in FIG. 13 corresponds to the control processor unit 8 of FIG. 1 and illustrates the part relating to the pull-in servo control in the case of pull-in from the state where the track is not traced.

The control processor unit 8A is provided with an A/D converter 82 to which the tracking error signal TE is input, the A/D converter 83 to which the sum signal PI is input, the tracking error signal normalization circuit 85, the first phase compensation digital filter 87A, a speed and position detector unit 91, a switching decision unit 92, a switch 93, an adder 94, a switching unit 95, the second phase compensation digital filter 87B, a switch 96, the D/A converter 89, and a control decision unit 97 (corresponding to the control decision unit 290 of FIG. 11).

The circuit configuration and operation of the A/D converters 82 and 83, normalization circuit 85, phase compensation digital filter 87A, and D/A converter 89 are equivalent to those explained by referring to FIG. 11. The control decision unit 97 corresponds to the control decision unit 290 of FIG. 11.

When the tracking is pulled in, as explained by referring to FIG. 11, normal tracking control is performed in the system of the D/A converter 89 at the solid line positions of the normalization circuit 85, phase compensation digital filter 87A, and switch 96.

In the case of pull-in from the state where the track is not traced, processing different from the normal tracking servo control becomes necessary.

The range where the tracking error signal TE is proportional to the amount of offset is a predetermined track range from the "on land" state in which the spot is located on a land, for example, ±¼ TRACK. When it exceeds this, the polarity of the tracking error signal TE becomes reverse.

At the time of pull-in, it is not known at which position of a track the spot is located, therefore it is necessary to use a method of control with a wide dynamic range.

The control processor unit 8A of FIG. 13 uses the tracking error signal TE and the cross track signal CTS calculated in the first embodiment to find the speed and position of a spot with respect to the track are found by the following method.

The control decision unit 97 of the control processor unit 8A monitors the speed of movement of the optical pick-up 8 with respect to the optical disk 2 from the speed and position detector unit 91, drives the switching decision unit 92 when the speed of movement is large, sets the switch 93 to the open state so that only the speed detection signal from the speed and position detector unit 91 is supplied to the adder unit 94, then drives the switching decision unit 95, sets the switch 96 to the state of the broken line, operates the focus control system so that the relative speed with the track becomes 0 by speed servo control using the speed signal, and moves the objective lens 65 mounted on the optical pick-up 6. The control decision unit 97 drives the switching decision unit 92 after confirming that the speed of movement becomes small to a certain extent, closes the switch 93, inputs the position detection signal from the speed and position detector 91 to the adder unit 94, and activates the position servo control as well to approach a position error of 0. After the speed and position have finished being pulled in to a certain extent, the control decision unit 97 switches to the tracking servo control explained above as the second embodiment.

Note that, in actuality, the phase compensation filter 87B is not used at the time of the speed position control. The speed position control signal is output to the D/A converter 89 as it is.

The speed and position detector unit 91 illustrated in FIG. 14 calculates the position and the speed as follows.

The tracking error signal TE and the cross track signal CTS can be approximated by a sine wave. There is a phase difference of 90° from each other. When the position of a spot with respect to a track is defined as x, the values of the tracking error signal TE and the cross track signal CTS can be thought of a $\sin(x)$ and $\cos(x)$. Waveform diagrams thereof are shown in FIG. 15.

The $\sin(x)$ of the triangular function can be approximated as $\sin(x)=x$ if the phase angle x is small.

If the phase at the previous sampling (position with respect to the track) is y and the phase at the present sampling is x, the phase difference (x−y) from previous time to this present time can be expressed by the following equation:

$$x-y \approx \sin(x-y) \tag{6}$$

The following equation is obtained from the formula of the triangular function:

$$\sin(x-y)=\sin(x)\cdot\cos(y)-\cos(x)\cdot\sin(y) \tag{7}$$

Further, the following equation is obtained $$x-y \approx \sin(x-y)=\sin(x)\cdot\cos(y)-\cos(x)\cdot\sin(x) \tag{8}$$

When the tracking error signal TE and the cross track signal CTS are converted from an analog to a digital and the amplitude is used as a reference, the $\cos(y)$, $\sin(y)$ able to be substituting in the portion of $\sin(x)\cdot\cos(x)$ of the above equation 7 can be found from the previous phase y.

The speed v is the phase difference per unit time, so is (x−y) itself. When $$v=x-y \tag{9}$$

the position x at the present sampling can be found by the following equation:

$$x=y+v \tag{10}$$

The speed and position detector unit 91 illustrated in FIG. 14 performs the above processing.

There is a phase difference of 90° with respect to the tracking error signal TE. The gain CTS GAIN is added to the cross track signal CTS expressed as cos(x) at an adder unit 911, and limiter processing is carried out at a limiter processor unit 912.

Equation 8 is processed at a multiplier unit 915 for performing the multiplication of sin(x)·cos(y), a memory 913 holding cos(x), a multiplier unit 916 for performing the multiplication of cos(x)·sin(y), a memory 914 for holding sin(x), and an adder unit 917 for performing the subtraction defined in equation 9.

The speed detection value v defined in equation 8 is output from the adder 917 and multiplied by a gain BRAKE DIF GAIN at a multiplier unit 920.

An adder 918 adds the result of the limiter processor unit 912 to the speed detection value v from the adder 917. An integration processor 919 integrates this to calculate the position detection value x. This position detection value x is held at memories 913 and 914.

The multiplier unit 920 multiplies a gain BRAKE DIF GAIN with the speed detection value v, while similarly the multiplier unit 921 multiplies a gain BRAKE PRO GAIN with the position detection value x. An adder unit 922 performs the operation of equation 9 (x=y+v). The result is converted at a D/A converter 923 and output.

The above signal processing is carried out for every sampling cycle of the A/D converter 82. The sampled result is stored in the memories 913 and 914.

Since a random phase data is stored at the first sampling, the speed is not correctly detected. Since however the distance from the stored phase is correctly measured, the correct phase is measured and stored. Also the speed is correctly measured from the second sampling.

In this way, in the present embodiment, the speed of movement v of the optical pick-up 6 and the position x of the optical pick-up 6 are found from the tracking error signal TE and the cross track signal CTS.

There is the advantage that the thus found speed detection value and position detection value can be detected for every sample and there is no wasted time.

When the tracking error signal TE is measured after pulsation, the speed cannot be detected before the edge of the pulse arrives. Further, the conversion gain is constant with respect to a land even at that position.

In actuality, there are cases where there are errors in the offset when the phase difference between the tracking error signal TE and the cross track signal CTS deviates from 90° due to fluctuations in the characteristics of the optical system in the optical pick-up 6 or fluctuations in the characteristics of the photodetectors of the photodetector and processor unit 67. At that time, the error due to the deviation in approximation is increased. When the offset exceeds ±20%, its influence no longer can be ignored.

Fourth Embodiment

As a fourth embodiment of the present invention, an explanation will be made of the pull-in servo control in the tracking control when the pull-in servo control explained as the third embodiment could not be carried out well by referring to FIG. 16 and FIG. 17.

Figure 16:
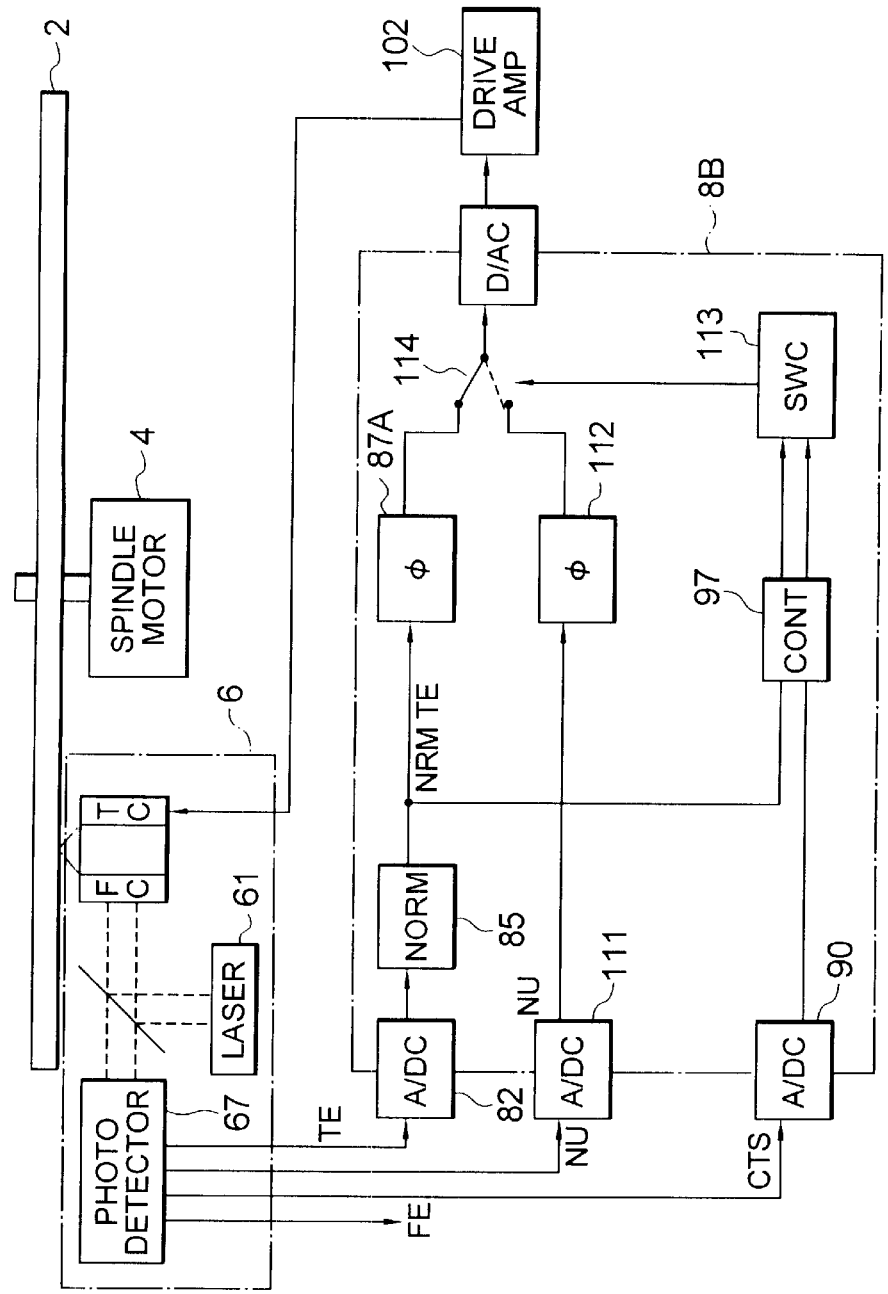
FIG. 16 is a block diagram illustrating details of a part related to the pull-in servo where the tracking could not be pulled in from the state where the track was not traced in the optical disk recording and reproducing apparatus illustrated in FIG. 1.

FIG. 16 is a block diagram illustrating details of the parts relating to the pull-in servo control to be performed in a case where pull-in is not possible from a state where the track was not traced in the optical disk recording and reproducing apparatus illustrated in FIG. 1.

FIG. 17 is a graph illustrating the waveforms of the tracking error signal TE and the cross track signal CTS indicating the timing for switching to the tracking servo control in the control processor unit 8B illustrated in FIG. 16.

Next, if the pull-in servo control could not be performed well for some reason or another and therefore a lock cannot be achieved even if more than a predetermined time, for example, 3.0 msec, has elapsed, the control decision unit 97 switches to the signal of a middle point sensor output from a switch 114 explained below as a fourth embodiment. Namely, in this case, the tracking is controlled so as to be fixed with respect to the carriage by the middle point sensor servo using the detection signal NU of the middle point sensor. Accordingly, in FIG. 16, a configuration in which the middle point sensor signal NU from the middle point sensor is converted to a digital signal at an A/D converter 111, phase compensated at a phase compensation filter 112, and selected and output from a switch 114 is adopted. The middle point sensor detection signal NU is obtained by a well known method.

The tracking error signal TE is synchronized with the eccentricity of the optical disk 2.

The control decision unit 97 monitors the normalization tracking error signal NORM TE from the normalization circuit 85 at that time. When the relative speed of the track and spot is small and the spot arrives on a land, it makes the switch 114 select the phase compensation digital filter 87A via the switch decision unit 113 at that instant and switches to the tracking servo control for control by this tracking error signal TE.

By this method, a long time is taken until a lock is achieved, but it is simple and reliable. Particularly, this method is characterized in that it is resistant to offset fluctuations of the cross track signal CTS.

The switching timing explained above will be concretely explained by referring to FIG. 17.

The control decision unit 97 confirms that the focus is locked, the cross track signal CTS is positive, the zero cross interval of the tracking error signal TE is more than a predetermined time t, for example, 272 μsec, the tracking error is less than a predetermined range, for example, ±25.0%, and the drive current supplied from the drive amplifier 102 to the tracking coil 68 has not more than a predetermined value, for example, 380 mA and then outputs the tracking error signal TE from the phase compensation digital filter 87A from the switch 114 and switches to tracking servo control for controlling the tracking coil 68.

Fifth Embodiment

As a fifth embodiment of the present invention, an explanation will be made of middle point sensor servo control by referring to FIG. 18.

FIG. 18 is a block diagram of details of the parts related to middle point sensor servo control in the optical disk recording and reproducing apparatus illustrated in FIG. 1.

If not controlling movement in the tracking direction when the focus servo control is not in action, part of the optical pick-up 6, for example, the objective lens 65, ends up mechanically contacting the frame when there is an outer disturbance and therefore the focus is lost. Further, when the carriage accelerates, the objective lens 65 ends up not moving fast enough during a sled seek operation. For this reason, an optical position sensor is provided at the carriage and the objective lens 65 is controlled to the mechanical middle point. The control for fixing the movement of the optical disk 2 in the tracking direction with respect to the carriage in this way is referred to as the middle point sensor servo control.

The control processor unit 8C illustrated in FIG. 18 reads the detection signal NU of the middle point sensor into the A/D converter 111 in the control processor unit 8C, converts this to a digital signal, compensates its phase at the phase compensation digital filter 112, then converts this to an analog signal at the D/A converter 113, and controls the tracking coil 68 of the optical pick-up 6 through the drive amplifier 102.

Individual methods of control were explained above as the second to fifth embodiments, but the control processor unit 8 illustrated in FIG. 1 performs all of the operations of the second to fifth embodiments. Further, although details of the focus control were not described, the control processor unit 8 of course also performs the focus control.

As explained above, the cross track signal CTS explained as the first embodiment of the present invention can be applied to tracking control in the third embodiment explained by referring to FIG. 13 and the fourth embodiment explained by referring to FIG. 16 regardless of whether or not the land and groove recording method is applied.

Further, cases where the present invention was applied to the optical disk recording and reproducing were explained as embodiments of the present invention, but the invention is not limited to the above examples. The present invention can be applied to other various optical disk recording and reproducing apparatuses in the same way as those described above.

Note that the processing in the signal processor unit 676 illustrated in FIG. 8 can be achieved also in for example the control processor unit 8 of FIG. 1, the control processor unit 8A of FIG. 13, etc. The DSP etc. are built in the control processor unit 8, the control processor unit 8A, etc., therefore the processing in the signal processor unit 676 can be easily carried out at the DSP.

If the processing of the signal processor 676 is carried out at the control processor unit 8, control processor unit 8A, or the like, it is necessary to guide a total of six detection signals from the photodetectors 671 to 673 to the control processor 8A from the optical pick-up 6. Further, a maximum of six A/D converters become necessary for the conversion of these to digital signals. Therefore, this is an increase of two A/D converters from the four A/D converts required if the signal processor unit 676 in the optical pick-up 6 calculates the tracking error signal TE, focus error signal FE, cross track signal CTS, and sum signal PI and inputs these signals to the control processor unit 8A.

Summarizing the effects of the invention, according to the method of generation (method of calculation) of the tracking error signal and the cross track signal explained above, it is possible to accurately generate and use for various applications a cross track signal of a 90° phase differential push-pull system relative to the tracking error signal for both of the case where the land width and the groove width in the optical disk are equal and the case where they are not equal.

In particular, the tracking error signal and the cross track signal have the advantage that they do not change even if the positions of the spots on the detectors change. It is possible to provide a stable and correct tracking error signal and cross track, possible to ease the conditions such as the optical pick-up and the arrangement of the optical pick-up and optical disk, and possible to provide a stable tracking error signal and cross track signal not influenced even by changes along with time.

Further, the intended signal can be obtained by changing the positional relationship of the main spot and the side spots. Even in such a case, the phase relationship between the tracking error signal and the cross track signal can be correctly obtained.

The method for generating the tracking error signal and the cross track signal explained above can be applied to an optical disk recording and reproducing apparatus of the "land and groove recording method" where the land width and the groove width are equal and where data is recorded and reproduced both to and from the lands and grooves, therefore it is possible to realize an optical disk recording and reproducing apparatus in which the recording density is substantially improved.

Further, by applying the method for generating the tracking error signal and the cross track signal explained above to an optical pick-up, an optical pick-up used for various optical disk recording and reproducing apparatuses can be provided. Namely, the above optical pick-up has wide applications both of and not of the land and groove recording method.

Further, the method for generating the tracking error signal and cross track signal explained above can be used for tracking pull-in servo control and the traverse counter at the time of a seek operation.

While the invention has been described by reference to specific embodiments chosen for purposes of illustration, it should be apparent that numerous modifications could be made thereto by those skilled in the art without departing from the basic concept and scope of the invention.

What is claimed is:

1. A signal generation method for positioning a main spot to be radiated on an optical disk and side spots of the two sides of the main spot on lands and grooves of the optical disk, detecting the reflected light of the main spot and side spots, and calculating a track error signal and a cross track signal shifted by a predetermined phase relative to the track error signal, said method comprising the steps of:

detecting the reflected light of the main spot by a first photodetector split into four sections in the track direction and tangential direction of the optical disk, detecting the reflected light of a first side spot at one side of the main spot by a second photodetector split into two sections in the track direction of the optical disk, and detecting the reflected light of a second side spot at the other side of the main spot by a third photodetector split into two sections in the track direction of the optical disk, wherein the first and second side spots are positioned a predetermined distance of ½ or less of the land pitch away from the main spot in the redial direction of the optical disk, and wherein the predetermined phase is 180 degrees or less; and calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors and finding the difference between the second error and the third error to calculate the cross track signal.

2. A signal, generation method as ser forth in claim 1, wherein the land width and the groove width in the optical disk are equal in order to optimize recording and reproduction characteristics for recording data on both lands and grooves of the optical disk and to optimize the recording density of the optical disk.

3. A signal generation method as set forth in claim 2, wherein the side spots at the two sides of the main spot are positioned a predetermined distance of ¼ of the land pitch away from the main spot in the radial direction of the optical disk, wherein the predetermined phase is 90 degrees.

4. A signal generation method as set forth in claim 1, wherein the land width and the groove width in the optical disk are different.

5. A signal generation method used for an optical disk recording and reproduction apparatus for positioning a main spot to be radiated on an optical disk and side spots of the two sides of the main spot on lands and grooves of the optical disk, detecting the reflected light of the main spot and side spots, and calculating a track error signal and a cross track signal shifted by a predetermined phase relative to the track error signal, said method comprising the steps of:

detecting the reflected light of the main spot by a first photodetector split into four sections in the track direction and tangential direction of the optical disk, detecting the reflected light of a first side spot at one side of the main spot by a second photodetector split into two sections in the track direction of the optical disk, and detecting the reflected light of a second side spot at the other side of the main spot by a third photodetector split into two sections in the track direction of the optical disk, wherein the first and second side spots are positioned a predetermined distance of ½ or less of the land pitch away from the main spot in the radial direction of the optical disk, wherein the predetermined phase is 180° degrees or less; and calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal.

6. A signal generation method used for an optical disk recording and reproduction apparatus as set forth in claim 5, wherein the cross track signal is used for discrimination of the state of the tracking error signal.

7. A signal generation method used for an optical disk recording and reproduction apparatus as set forth in claim 6, wherein the cross track signal and tracking error signal are used for judgement of tracking pull-in.

8. A signal generation method used for an optical disk recording and reproduction apparatus as set forth in claim 5 wherein the cross track signal and the tracking error signal are used to calculate the speed of movement and position of an optical pick-up with respect to the optical disk.

9. A signal generation method used for an optical disk recording and reproduction apparatus as set forth in claim 8, wherein the calculated speed of movement and position are used for judging tracking pull-in.

10. An optical pick-up for positioning a main spot to be radiated on an optical disk and side spots of the two sides of the main spot on lands and grooves of the optical disk, detecting the reflected light of the main spot and side spots, and calculating a track error signal and a cross track signal shifted by a predetermined phase relative to the track error signal, said optical pick-up comprising:

a first photodetector split into four sections in the direction and tangential direction of the optical disk and receiving the reflected light of the main spot, a second photodetector split into two sections in-the track direction of the optical disk and receiving the reflected light of a first side spot at one side of the main spot, a third photodetector split into two sections in the track direction of the optical disk and receiving the reflected light of a second side spot at the other side of the main spot, an optical system for directing the main spot and the two side spots to the optical disk and leading the reflected light of the main spot and the side spots to the first to third photodetectors, wherein the optical system positions the side spots at the two sides of the main spot a predetermined distance of ½ or less of the land pitch away from the main spot in the radial direction of the optical disk, and wherein the predetermined phase is 180 degrees or less; and a signal processing means for calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal.

11. An optical pick-up as set forth in claim 10, further having a tracking coil and focus coil.

12. An optical pick-up as set forth in claim 10, wherein the land width and the groove width in the optical disk are equal in order to optimize recording and reproduction characteristics for recording data on both lands and grooves of the optical disk and to optimize the recording density of the optical disk.

13. An optical pick-up as set forth in claim 12, wherein the optical system positions the side spots at the two sides of the main spot a predetermined distance of ¼ of the land pitch away from the main spot in the radial direction of the optical disk, wherein the predetermined phase is 90 degrees.

14. An optical pick-up as set forth in claim 10, wherein the land width and the groove width in the optical disk are different.

15. An optical disk recording and reproducing apparatus comprising:

an optical disk on which lands and grooves are formed adjoining each other in the radial direction;

an optical pick-up able to move relative to the optical disk in the track direction of the optical disk; and a control means for tracking control of the optical pick-up with respect to the optical disk in accordance with a detection signal from the optical pick-up;

the optical pick-up having:

a first photodetector split into four sections in the track direction and tangential direction of the optical disk and receiving the reflected light of the main spot, a second photodetector split into two sections in the track direction of the optical disk and receiving the reflected light of a first side spot at one side of the main spot, a third photodetector split into two sections in the track direction of the optical disk and receiving the reflected light of a second side spot at the other side of the main spot, an optical system for directing the main spot and the two side spots to the optical disk and leading the reflected light of the main spot and the side spots to the first to third photodetectors, wherein the optical system positions the side spots at the two sides of the main spot a predetermined distance of ½ or less of the land pitch away from the man spot in the radial direction of the optical disk, and wherein the predetermined phase is 180 degrees or less; and a signal processing means for calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by substring from the first error the sum of the second and third errors, and finding the difference between the second error and the third error to calculate the cross tack signal having a predetermined phase difference from the tracking error signal and the control means using the tracking error signal and cross track signal for tracking control.

16. An optical disk recording and reproduction apparatus as set forth in claim 15, wherein the signal processing means of the optical pick-up further calculates at least a focus error signal from the four signals of the first photodetector, the optical pick-up has a focus coil, and the control means uses the focus error signal for focus control.

17. An optical disk recording and reproduction apparatus as set forth in claim 16, wherein the land width and the groove width in the optical disk are equal in order to optimize recording and reproduction characteristics for recording data on both lands and grooves of the optical disk and to optimize the recording density of the optical disk.

18. An optical disk recording and reproduction apparatus as set forth in claim 17, wherein the side spots at the two sides of the main spot are positioned exactly a predetermined distance of ¼ of the land pitch away from the main spot in the radial direction of the optical disk, wherein the predetermined phase is 90 degrees.

19. An optical disk recording and reproduction apparatus as set forth in claim 16, wherein the land width and the groove width in the optical disk are different.

20. An optical disk recording and reproduction apparatus as set forth in claim 15, wherein the cross track signal is used for discrimination of the state of the tracking error signal.

21. An optical disk recording and reproduction apparatus as set forth in claim 15, wherein the cross track signal and the tracking error signal are used to calculate the speed of movement and position of the optical pick-up with respect to the optical disk.

22. An optical disk recording and reproduction apparatus as set forth in claim 15, wherein the speed of movement and position of the optical pick-up are used for judgement of tracking pull-in.

23. An optical disk recording and reproduction apparatus as set forth in claim 15, wherein the cross track signal and tracking error signal are used for judgement of tracking pull-in.

24. An optical disk recording and reproducing apparatus comprising:

an optical disk on which lands and grooves are formed adjoining each other in the radial direction;

an optical pick-up able to move relate to the optical disk in the track direction of the optical disk; and a control means for tracking control of the optical pick-up with respect to the optical disk in accordance with a detection sign from the optical pick-up; the optical pick-up having:

a first photodetector split into four sections in the track direction and tangential direction of the optical disk and receiving the reflected light of the main spot, a second photodetector split into two sections in the track direction of the optical disk and receiving the reflected light of a first side spot at one side of the main spot, a third photodetector split into two sections in the track direction of the optical disk and receiving the reflected light of a second side spot at the other side of the main spot, an optical system for directing the main spot and the two side spots to the optical disk and leading the reflected light of the main spot and the side spots to the first to third photodetectors, wherein the optical system positions the side spots at the two sides of the main spot a predetermined distance of ½ or less of the land pitch away from the main spot in the radial direction of the optical disk, and wherein the predetermined phase is 180 degrees or less; and a tracking coil, the control means calculating a first error as an error in the radial direction of the optical disk from four detection signals detected by the first photodetector, calculating a second error as an error of two detection signals of the second photodetector, calculating a third error as an error of two detection signals of the third photodetector, calculating the tracking error signal by subtracting from the first error the sum of the second and third errors, and finding the difference between the second error and the third error to calculate the cross track signal having a predetermined phase difference from the tracking error signal and the control means using the tracking error signal and cross track signal for tracking control.

\* \* \* \* \*